US011399065B1

(12) United States Patent
Thirumurthy et al.

(10) Patent No.: US 11,399,065 B1
(45) Date of Patent: Jul. 26, 2022

(54) APPARATUS, SYSTEM, METHOD, AND COMPUTER PROGRAM PRODUCT FOR SCALING AND MANAGING ELECTRIC POWER SYSTEMS

(71) Applicant: Vybe Energy, LLC, Falls Church, VA (US)

(72) Inventors: Nisha Thirumurthy, Falls Church, VA (US); Gabriel Kiblin, Falls Church, VA (US)

(73) Assignee: VYBE ENERGY, LLC, Falls Church, VA (US)

( * ) Notice: Subject to any disclaimer, the term of this patent is extended or adjusted under 35 U.S.C. 154(b) by 298 days.

(21) Appl. No.: 16/735,488

(22) Filed: Jan. 6, 2020

(51) Int. Cl.
*G05D 17/00* (2006.01)
*H04L 67/12* (2022.01)
(Continued)

(52) U.S. Cl.
CPC .......... *H04L 67/12* (2013.01); *G05B 19/042* (2013.01); *G06N 5/04* (2013.01); *G06N 20/00* (2019.01); *G06Q 30/04* (2013.01); *G06Q 30/0611* (2013.01); *G06Q 50/06* (2013.01); *H04L 12/2803* (2013.01); *G05B 2219/2639* (2013.01); *H02J 3/381* (2013.01); *H02J 7/34* (2013.01)

(58) Field of Classification Search
CPC .... H02J 7/35; H02J 7/34; H02J 3/381; H01M 8/188; H04L 12/2803; H04L 67/12; G06Q 50/06; G06Q 30/0611; G06Q 30/04; G05B 19/042; G05B 2219/2639; G06N 20/00; G05N 5/04
See application file for complete search history.

(56) References Cited

U.S. PATENT DOCUMENTS 4,059,969 A  11/1977 Awalt, Jr.
4,118,637 A  10/1978 Tackett
(Continued)

FOREIGN PATENT DOCUMENTS

JP    2009033802 A   10/2011
WO    WO2011074561    6/2011

OTHER PUBLICATIONS

Boxwell, Michael, "Solar Electricity Handbook," Chapters 1-4, accessible at http://www.solarelectricityhandbook.com, visited Jan. 6, 2020.

*Primary Examiner* — Tuan A Vu
(74) *Attorney, Agent, or Firm* — David, Brody & Dondershine, LLP; Ralph P. Albrecht

(57) ABSTRACT

Energy and demand costs reduction method through management of an entity load using an energy storage system; simulating the entity load including using predictive analytics; or receiving user inputs of an event schedule impacting entity load; performing optimization at start of billing cycle including establishing a demand reduction target achievable with an energy storage system device implemented; setting a periodic schedule for energy storage system discharge and allocating a portion of energy storage capacity to a reserve to be used in event of volatility in entity load; determining any unused capacity of the energy storage system at an end of a period, and responsive to the determining, redistributing any unused capacity to a remaining period of the schedule; and resetting the demand reduction target for each time-of-use period to what was achieved previously for the same billing period.

21 Claims, 13 Drawing Sheets

(51) Int. Cl.
*G05B 19/042* (2006.01)
*G06N 5/04* (2006.01)
*G06Q 30/04* (2012.01)
*G06N 20/00* (2019.01)
*G06Q 30/06* (2012.01)
*H04L 12/28* (2006.01)
*G06Q 50/06* (2012.01)
*H02J 7/34* (2006.01)
*H02J 3/38* (2006.01)

(56) References Cited

U.S. PATENT DOCUMENTS

| | | | |
|---|---|---|---|
| 7,830,038 B2 | 11/2010 | Wang | |
| 7,908,036 B2 | 3/2011 | Kirchner et al. | |
| 7,957,846 B2 | 6/2011 | Haikim et al. | |
| 8,253,271 B2 | 8/2012 | Pan | |
| 8,330,296 B2 | 12/2012 | Ottman | |
| 9,010,133 B2 | 4/2015 | Ashrafzadeh et al. | |
| 9,300,141 B2 | 3/2016 | Marhoefer | |
| 9,422,922 B2 | 8/2016 | Sant'Anselmo et al. | |
| 9,489,701 B2 | 11/2016 | Emadi et al. | |
| 9,645,596 B1 | 5/2017 | Ja-Chin et al. | |
| 9,960,637 B2 | 5/2018 | Sanders et al. | |
| 10,060,296 B2 | 8/2018 | Friesth | |
| 10,378,792 B2 | 8/2019 | Guha et al. | |
| 10,428,713 B2 | 10/2019 | Taylor et al. | |
| 2010/0133820 A1 | 6/2010 | Tsao | |
| 2012/0130556 A1 | 5/2012 | Marhoefer | |
| 2012/0303397 A1 | 11/2012 | Prosser | |
| 2013/0190939 A1* | 7/2013 | Lenox | H02J 3/381 700/291 |
| 2014/0170511 A1* | 6/2014 | Tolmachev | H01M 8/188 429/418 |
| 2014/0330695 A1* | 11/2014 | Steven | G06Q 30/0611 705/37 |
| 2015/0057820 A1* | 2/2015 | Kefayati | G06Q 50/06 700/291 |
| 2015/0066228 A1* | 3/2015 | Clifton | H04L 12/2803 700/295 |
| 2016/0109916 A1* | 4/2016 | Li | H02J 7/35 700/295 |
| 2017/0351234 A1* | 12/2017 | Chen | H02J 7/34 |
| 2020/0051182 A1* | 2/2020 | Fox | H04L 67/12 |

\* cited by examiner

800

EXEMPLARY
CONTROLLER
HARDWARE
ARCHITECTURE

900

EXEMPLARY
NETWORK
HARDWARE
ARCHITECTURE

APPARATUS, SYSTEM, METHOD, AND COMPUTER PROGRAM PRODUCT FOR SCALING AND MANAGING ELECTRIC POWER SYSTEMS

CROSS-REFERENCE TO RELATED APPLICATIONS

This application is a nonprovisional U.S. Patent Application, it does not claim priority to any other U.S. Patent Application pending, at this time.

BACKGROUND OF THE DISCLOSURE

Field of the Disclosure

The disclosure relates generally to energy systems, and more particularly to energy management systems.

Related References

Certain regional energy cooperatives may have agreements with wholesale utilities limiting alternative or renewable energy generation production to a given percentage of power. One way to bypass restrictions on the limits is expansion of locally owned residential and commercial solar electric systems. The term behind the meter (BTM) in the photovoltaic (PV) industry refers to renewable energy generating facilities that produces power intended for on-site use in homes, offices, and other commercial entity facilities. The PV system is on the owner's property, not on the side of the utility, or electric grid.

As BTM energy generation (such as, e.g., but not limited to, Solar) has become more ubiquitous due to attractive Federal and State incentives, grid load curve, in some states like California, are experiencing what is referred to as a "duck" curve see FIG. 1. FIG. 1 depicts an exemplary duck curve plotting exemplary power generation on an exemplary date depicting exemplary net energy load 110 measured in exemplary Megawatts on vertical (ordinal) axis 104 with respect to hours of a given exemplary day on the horizontal (abscissa) axis 102. FIG. 1 illustrates an exemplary steep ramping need 108 and an exemplary overgeneration risk 106 in the trough of the curve. FIG. 1 shows exemplary historical, actual, and exemplary projected load curves on an exemplary date, March 31, as the number of BTM solar projects increases with respect to years. The exemplary load curve depicts how reliance on the electricity grid between the hours of the exemplary hours 112 of 7 AM to 4 PM from 2012 to 2020 decreases substantially as most of the power illustrated in Megawatts 104, becomes provided by BTM solar projects, according to an exemplary embodiment. Likewise, reliance on the grid increases substantially between the exemplary hours 114 of between 4 PM and 7 PM as the solar projects stop producing from waning sunlight in the evening of the exemplary given northern hemisphere region. According to an exemplary challenge, unmet by conventional solutions, the exemplary utility is unable to ramp up energy generation to meet and take over the 13,000 MW of demand over the three hour period with a conventional mix of generation assets.

Utilities have sought to address this issue by increasing the utility's charged rate or so-called tariff, during the illustrated three-hour period 114 to incentivize consumers to use less energy and to reduce the stress on the electrical grid. These responses by utilities in turn are creating financial opportunities for deployment of BTM energy storage systems. For example, the graph of FIG. 1 depicts a typical example of time-of-use (TOU) rates that a small to mid-size commercial entity might experience over an exemplary 24-hour period. TOU rates for a given date are segmented, and the utility charges different rates from an energy and demand perspective. Consider, for example, but not limited to, that a utility charges exemplary tariffs of US$5 per kilowatt hour (kwh) for offpeak, $20/kwh for peak rate usage, $10/kwh for mid-peak, a max monthly rate of $5/kwh, and a maximum non-coincidental annual rate of $5/kwh. An example business or home would seek to reduce demand (D) during peak hours using demand reduction (DR) techniques. Previously, the peak period of demand was from 12 pm-6 pm. Today, the peak time period has shifted in certain geographic regions to the period of combined periods 112 and 114, of between the hours of 4 PM and 9 PM, when peak demand charges are high, and that peak period is an ideal time to use a battery to reduce demand, for example. However, sizing an exemplary BTM renewable and battery/energy storage systems optimally based on the load curve is important to ensure that there is enough power generation capacity to reduce the load, as well as, to ensure that there is enough energy storage, e.g., battery capacity, available during the exemplary approximately 5-hour peak time period. Load curves can vary by which of the 365 days of the year, since certain energy consumption demands and energy sources may vary by time of the year.

Conventional systems require electric power transmission and distribution system operators and utilities to build infrastructure to support peak demand, the costs of which are passed on to the customer, for example, via tariffs including demand response programs, market-based pricing, and other time-based pricing. While incentives may be offered to reduce demand during peak times, customers are often not in a position to reduce power usage through conventional load reduction and load shifting measures and as such, have instead attempted to employ the use of, for example, on-site energy storage systems (e.g., batteries) or other energy assets. However, the customer then bears the cost of having the on-site energy storage system installed, maintained, and operated and, furthermore, bears the risk that the cost savings do not justify the expenditures. Moreover, the utilities generally have no control over deployment and operation of the on-site energy storage systems deployed in the field and cannot rely on these resources like other traditional generators as firm capacity products, for purposes such as resource adequacy.

Small to medium-sized commercial and industrial customers do not conventionally have resources or capability to manage daily operations of their energy generation and storage systems on a real-time basis. What is needed is a manner of seamlessly managing BTM systems to both maximize savings as well as optimally use the energy generation and storage systems.

Many conventional control systems have a "set it" and "forget it" approach to deploying BTM storage. This approach means that the exemplary conventional controller solutions fail to take into consideration real time building load and impact of other technologies that impact shape and volatility of the load curve and tools that could assist in keeping load stable.

What is needed then are systems and methods to overcome shortcomings of conventional solutions to provide customers with greater control over their source of energy and use of assets that could reduce energy bills of the customers.

SUMMARY OF THE DISCLOSURE

Although described in terms of an apparatus or system embodiment, other alternative exemplary embodiments can be directed to a system, method, computer program product, mobile application, a web-based application program, a cloud-based software application as a service, a distributed workstation and/or PC-based application software program, a console application, a virtual reality application, an augmented reality application, mobile application, and/or other well known computer system format, including, in an exemplary embodiment, energy story system device sizing and management, according to an exemplary embodiment.

According to one exemplary embodiment, an apparatus, system, method, computer program product and/or application, can be provided according to an exemplary embodiment of the invention, wherein an exemplary embodiment can include, e.g., but not limited to, a method including reducing energy and demand costs through management of an entity load by using an energy storage system device; simulating the entity load including using predictive analytics; or receiving user inputs of an event schedule that impacts entity load, performing optimization at the start of the billing cycle including establishing a demand reduction target achievable with the energy storage system device implemented; setting a periodic schedule for the energy storage system device discharge and allocate a portion of energy storage capacity to a reserve to be used in the event of volatility in entity load; determining whether there is unused capacity of the energy storage system device at an end of a period, and responsive to the determining, redistributing any of the unused capacity to a remaining period of the schedule; and resetting the demand reduction target for each time-of-use period to what was achieved the previous period for the same billing period.

According to another exemplary embodiment, a nontransitory computer readable medium embodying instructions thereon, can when executed by at least one computer processor can provide a method including, e.g., but not limited to, reducing energy and demand costs through management of an entity load by using an energy storage system device; simulating the entity load including using predictive analytics; or receiving user inputs of an event schedule that impacts entity load; performing optimization at the start of the billing cycle including establishing a demand reduction target achievable with the energy storage system device implemented; setting a periodic schedule for the energy storage system device discharge and allocate a portion of energy storage capacity to a reserve to be used in the event of volatility in entity load; determining whether there is unused capacity of the energy storage system device at an end of a period, and responsive to the determining, redistributing any of the unused capacity to a remaining period of the schedule; and resetting the demand reduction target for each time-of-use period to what was achieved the previous period for the same billing period, according to an exemplary embodiment.

According to an exemplary embodiment, a system can include: a computer processor service provider system; and an onsite controller coupled to the computer processor service provider system by a communications network; wherein the onsite controller can include: at least one computer processor; and at least one computer memory coupled to the at least one processor; wherein the at least one processor of the onsite controller is configured to: reduce energy and demand costs through management of an entity load by use of at least one energy storage system device; simulate an entity load by use of at least one or more of: predictive analytics; or receive user inputs of an event schedule that impacts entity load; perform optimization at the start of the billing cycle to establish a demand reduction target achievable with the energy storage system device implemented; set a periodic schedule for the energy storage system device discharge and allocate a portion of energy storage capacity to a reserve to be used in the event of volatility in entity load; determine whether there is unused capacity of the energy storage system device at an end of a period, and responsive to the determination, redistribute any of the unused capacity to a remaining period of the schedule; and reset the demand reduction target for each time-of-use period to what was achieved the previous period for the same billing period.

According to one exemplary embodiment, the system may include where the energy storage system device can include at least one or more of: at least one battery; at least one lithium ion battery; at least one lead acid battery; at least one heat exchanger system; or at least one compressed air energy storage device.

According to one exemplary embodiment, the system may include where the entity can include at least one or more of: a building; a campus; a business; a residential home; a commercial business; a governmental building; a private building; a public building; a group of associated buildings; an investor owned utility or a municipal utility a university; or a school.

According to one exemplary embodiment, the system may include where the at least one processor of the onsite controller is configured to simulate an entity load can include wherein the at least one processor is configured to at least one or more of: receive dynamic electric vehicle (EV) load based on at least one or more of: at least one type of an EV; or a frequency of charging of an EV at a specific location; or simulate the entity load from impact of EV charging.

According to one exemplary embodiment, the system may include where the received EV load, or the simulation of the entity load from impact of the EV charging can include wherein the at least one processor is configured to: receive EV load or simulate impact of the EV charging can include: at least one TESLA electric vehicle; at least one automotive electric vehicle; at least one sport utility vehicle electric vehicle; at least one electric truck vehicle; at least one motor cycle electric vehicle; at least one tractor trailer electric vehicle; any kind of municipal fleet vehicle; at least one postal vehicle; at least one bus; or at least one garbage truck.

According to one exemplary embodiment, the system may include where the received EV load or the simulation of the entity load from impact of the EV charging can include wherein the at least one processor is configured to: simulate impact of the EV charging can include: at least one battery type; at least one charger type; at least one DC charger; at least one fast DC charger; at least one AC charger; at least one predetermined frequency of charging; at least one predetermined number of simultaneous electric vehicles charging; at least one historical data of electric vehicle charging; at least one machine learning prediction of an expected number of EV charging in a given time period; at least one seasonality effect on EV charging; or at least one expected number of EV vehicles on the road as a proportion of market share to calculate entity load.

According to one exemplary embodiment, the system may include where the management can include real-time management.

According to one exemplary embodiment, the system may include where the at least one processor is configured to reduce the energy and the demand costs through management of the entity load further can include: at least one load shedding process.

According to one exemplary embodiment, the system may include where the computer processor service provider system can include a cloud-based computer processor service provider system.

According to one exemplary embodiment, the system may include where the cloud-based computer processor service provider system can include at least one or more of: an AMAZON WEB SERVICES (AWS) cloud-based system; a GOOGLE cloud-based system; a MICROSOFT cloud-based system; an IBM cloud-based system; or another cloud-based system.

According to one exemplary embodiment, the system may include where the predictive analytics can include at least one or more of: machine learning (ML)-based analysis system, or an artificial intelligence (AI)-based analysis system, based on at least one or more of: weather data can include at least one or more of: temperature data can include at least one or more of: heating degree days, cooling degree days, or humidity, cloud cover data, or other weather element data; historical data can include at least one or more of: week of the year data, previous energy efficiency improvements, or ongoing energy efficiency improvements; current occupancy rates; or impact of electric vehicle (EV) charging can include at least one or more of: at least one battery type; at least one charger type; at least one DC charger; at least one fast DC charger; at least one AC charger; at least one predetermined frequency of charging; at least one predetermined number of simultaneous electric vehicles charging; at least one historical data of electric vehicle charging; at least one machine learning prediction of an expected number of EV charging in a given time period; at least one seasonality effect on EV charging; or at least one expected number of EV vehicles on the road as a proportion of market share to calculate entity load.

According to one exemplary embodiment, the system may include where the entity load can include at least one or more of: a daily entity load; an entity load for a period of time; an entity load for a fraction of a day; an entity load for an increment of time; an entity load for an up to a 15 minute increment of time; an entity load for a 15 minute increment of time; an entity load for a 1 day period; an entity load for a 2 day period; an entity load for a 3 day period; an entity load for a 4 day period; an entity load for a 3-4 day period; an entity load for a 5 day period; an entity load for a 6 day period; an entity load for a 7 day period; an entity load for a one week period; an entity load for a multiple week period; an entity load for a month long period; an entity load for a multiple month period; an entity load for a season long period; an entity load for a multiple season long period; an entity load for a year long period; or an entity load for a multiple year long period.

According to one exemplary embodiment, the system may include where the event schedule can include at least one or more of: a daily event schedule; a daily periodic schedule; a daily minute-by-minute schedule; an event schedule for a period of time; an event schedule for a fraction of a day; an event schedule for an increment of time; an event schedule for an up to a 15 minute increment of time; an event schedule for a 15 minute increment of time; an event schedule for a 1 day period; an event schedule for a 2 day period; an event schedule for a 3 day period; an event schedule for a 4 day period; an event schedule for a 3-4 day period; an event schedule for a 5 day period; an event schedule for a 6 day period; an event schedule for a 7 day period; an event schedule for a one week period; an event schedule for a multiple week period; an event schedule for a month long period; an event schedule for a multiple month period; an event schedule for a season long period; an event schedule for a multiple season long period; an event schedule for a year long period; or an event schedule for a multiple year long period.

According to one exemplary embodiment, the system may include where the demand reduction target can include at least one or more of: a daily demand reduction target; a demand reduction target for a period of time; or a demand reduction target for a fraction of a day; a demand reduction target for an increment of time; a demand reduction target for an up to a 15 minute increment of time; a demand reduction target for a 15 minute increment of time; a demand reduction target for a 1 day period; a demand reduction target target for a 2 day period; a demand reduction target for a 3 day period; a demand reduction target for a 4 day period; a demand reduction target for a 3-4 day period; a demand reduction target for a 5 day period; a demand reduction target for a 6 day period; a demand reduction target for a 7 day period; a demand reduction target for a one week period; a demand reduction target for a multiple week period; a demand reduction target for a month long period; a demand reduction target for a multiple month period; a demand reduction target for a season long period; a demand reduction target for a multiple season long period; a demand reduction target for a year long period; or a demand reduction target for a multiple year long period.

According to one exemplary embodiment, the system may include where the time-of-use period can include at least one or more of: peak; off peak; super off peak; charging off peak; discharging peak; or another time-of-use period.

According to one exemplary embodiment, the system may include where the at least one computer processor is configured to: determine one or more of: whether actual entity load is greater than a predicted load; or whether on-site renewable energy production does not sufficiently meet the predicted load and the energy storage system device usage is higher than what was set aside including reserve, and responsive to the determination, start automatic load shedding based on priorities set by owner of the entity.

According to one exemplary embodiment, the system may include where the automatic load shedding can include at least one of: shed lighting load in certain parts of the entity; shed other electricity demand load of the entity; shed non-essential electricity demand load of the entity; maintaining essential electricity demand load for essential services of the entity; shed air conditioning load; shed heating load; shed heating ventilation air conditioning (HVAC) load; cut off power to an EV charging station; cut off air conditioning load; cut off heating; cut off fan; or perform another predetermined load shedding function.

According to one exemplary embodiment, the system may further include where the at least one computer processor is configured to: participate in at least one utility service can include at least one or more of: demand response; frequency management; or another ancillary service.

According to an exemplary embodiment, the system can further include using at least one alternative energy generation source can include at least one or more of: an alternative energy generation source; a solar energy generation source; a turbine-based energy generation source; a wind turbine energy generation source; a renewable energy generation source; a direct current (DC) based energy generation source; an alternating current (AC) based energy generation source; a hybrid energy generation source; a diesel generator energy generation source; a hydrogen fuel cell energy generation source; a nuclear energy generation source; a heat based energy generation source; a combined heat and power (CHP) energy generation source; a generator energy generation source; a solar panel energy generation source; an electronic vehicle solar energy generation source; a water based turbine energy generation source; a turbocharged energy generation source; or a supercharged energy generation source.

According to yet another exemplary embodiment, a method may include reducing, by at least one computer processor, energy and demand costs through management of an entity load by using at least one energy storage system device; simulating, by the at least one computer processor, an entity load can include at least one or more of: using, by the at least one computer processor, predictive analytics; or receiving, by the at least one computer processor, user inputs of an event schedule that impacts entity load; performing, by the at least one computer processor, optimization at the start of the billing cycle can include establishing, by the at least one computer processor, a demand reduction target achievable with the energy storage system device implemented; setting, by the at least one computer processor, a periodic schedule for the energy storage system device discharge and allocate a portion of energy storage capacity to a reserve to be used in the event of volatility in entity load; determining, by the at least one computer processor, whether there is unused capacity of the energy storage system device at an end of a period, and responsive to the determining, redistributing, by the at least one computer processor, any of the unused capacity to a remaining period of the schedule; and resetting, by the at least one computer processor, the demand reduction target for each time-of-use period to what was achieved the previous period for the same billing period.

According to another exemplary embodiment, a nontransitory computer accessible media, embodying program instructions, which when executed on at least one electronic computer processor, may perform a method including reducing, by at least one computer processor, energy and demand costs through management of an entity load by using at least one energy storage system device; simulating, by the at least one computer processor, an entity load can include at least one or more of: using, by the at least one computer processor, predictive analytics; or receiving, by the at least one computer processor, user inputs of an event schedule that impacts entity load; performing, by the at least one computer processor, optimization at the start of the billing cycle can include establishing, by the at least one computer processor, a demand reduction target achievable with the energy storage system device implemented; setting, by the at least one computer processor, a periodic schedule for the energy storage system device discharge and allocate a portion of energy storage capacity to a reserve to be used in the event of volatility in entity load; determining, by the at least one computer processor, whether there is unused capacity of the energy storage system device at an end of a period, and responsive to the determining, redistributing, by the at least one computer processor, any of the unused capacity to a remaining period of the schedule; and resetting, by the at least one computer processor, the demand reduction target for each time-of-use period to what was achieved the previous period for the same billing period.

BRIEF DESCRIPTION OF THE DRAWINGS

Various exemplary features and advantages of the disclosure will be apparent from the following, more particular description of exemplary embodiments of the present disclosure, as illustrated in the accompanying drawings wherein like reference numbers generally indicate identical, functionally similar, and/or structurally similar elements. The left most digits in the corresponding reference number generally indicate the drawing in which an element first appears.

DETAILED DESCRIPTION OF VARIOUS EXEMPLARY EMBODIMENTS OF THE DISCLOSURE

A preferred exemplary embodiment of the disclosure is discussed in detail below. While specific exemplary embodiments are discussed, it should be understood that this is done for illustration purposes only. A person skilled in the relevant art will recognize that other components and configurations may be used without parting from the spirit and scope of the disclosure.

Figure 1:
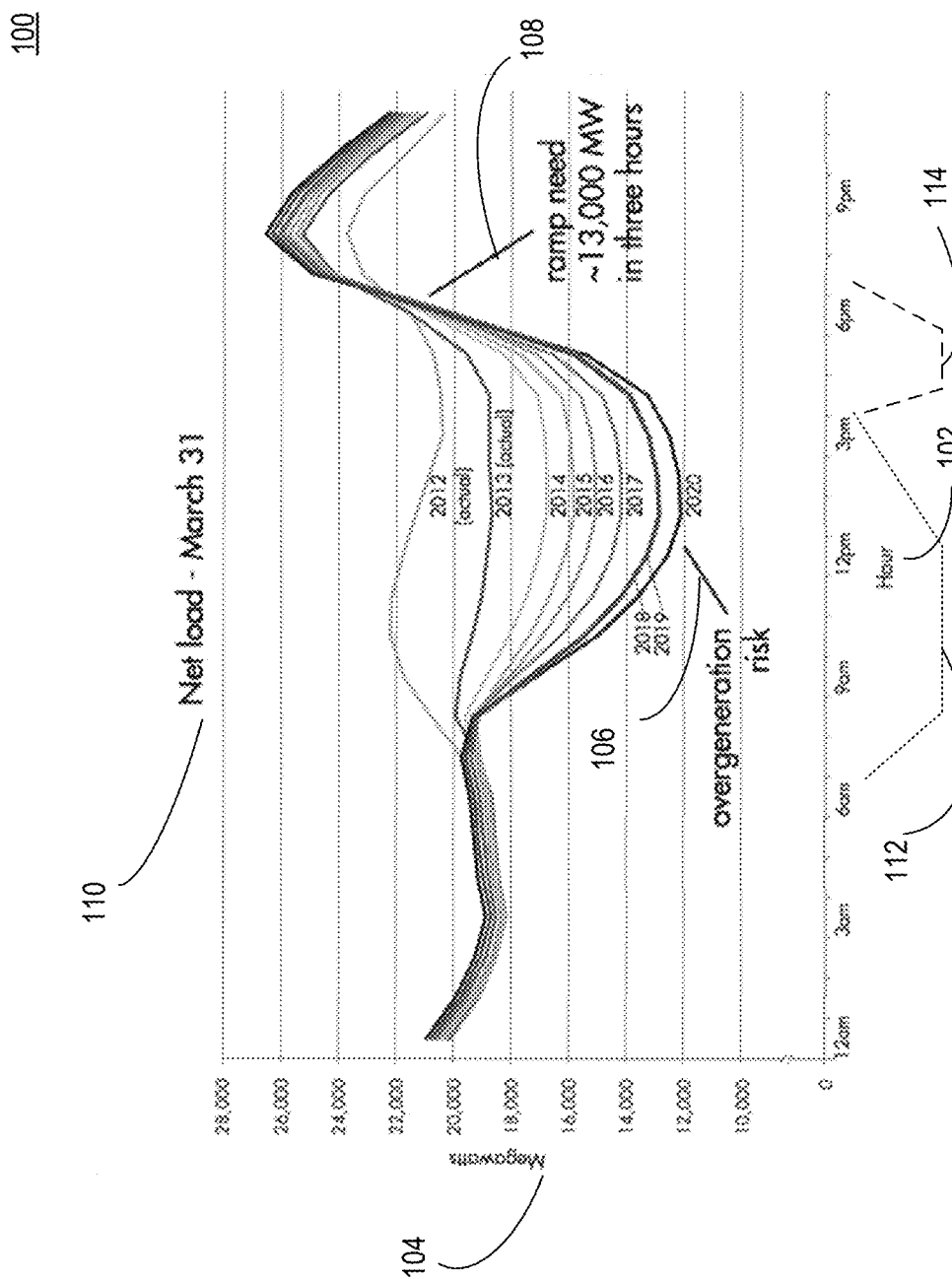
FIG. 1 depicts an exemplary embodiment of an exemplary load curve diagram illustrating an exemplary embodiment of an exemplary duck-shaped load curve illustrating exemplary overgeneration risk and steep ramping, according to an exemplary embodiment.

FIG. 1 depicts an exemplary diagram of an exemplary duck-shaped energy demand load curve for an exemplary day March 31, as well as illustrating a range of historical, actual and predicted demand curves, illustrating exemplary overgeneration risk and ramp demand, according to an exemplary embodiment.

In this regard, areas for improving known and existing systems have been identified. Through applied effort, ingenuity, and innovation, solutions to improve such systems, methods and computer program products, have been realized and are described in connection with embodiments of the present invention set forth in the numbered claims below.

While there are several organizations currently developing controllers to manage customer utility charges through the implementation of energy storage, being able to actually deliver demonstrable customer cost savings can be complicated. Conventional systems fail to actually produce cost savings, because of such things as, e.g., but not limited to, building load cannot be accurately predicted, etc. Even with the best prediction algorithms building load can become volatile especially with proliferation of electric vehicles (EVs) and EV charging infrastructure, which can significantly increase building demand. To overcome these shortcomings of conventional systems, exemplary embodiments of the invention can allow for, e.g., but not limited to, real-time load shedding or temporarily turning off EV charging to control a building's load. Various exemplary embodiments of the present invention provide improved methods of both achieving load shedding and temporarily turning off charging.

Various exemplary embodiments can relate to systems, methods and/or computer program products including instructions which when executed on a processor, can provide improved exemplary novel versions of: (1) exemplary energy management and/or optimization methods, which may include, e.g., but not limited to, both exemplary energy storage and/or exemplary renewable energy sources; (2) exemplary network models for exemplary storage, exemplary arbitrage and/or exemplary distribution of exemplary electricity, including, e.g., but not limited to, exemplary electricity that is used for ancillary services; (3) exemplary methods for exemplary demand side management and/or exemplary load shifting; and/or (4) exemplary incorporation of exemplary predictive algorithms into (1), (2) and (3).

Various conventional systems, which can be used in combination with the exemplary embodiments can include, e.g., but not limited to, U.S. Pat. No. 9,645,596 in the area of energy portfolio level optimization, U.S. Pat. No. 9,300,141 in the area of virtual power plant system and method incorporating renewal energy, storage and scalable value-based optimization, U.S. Pat. No. 7,957,846 relating to energy arbitrage by load shifting, and U.S. Pat. No. 9,489,701 relating to an adaptive energy management system, the contents of all of which are incorporated herein by reference in their entireties.

With the proliferation of EVs by increasing number, the impact of such EV charging demand threatens to disrupt building load estimated demand, and causing substantial challenges to building managers seeking to manage power demand, and/or battery storage usage.

The present invention synthesizes elements from various conventional systems, including exemplary energy management and/or optimization methods, which may include exemplary energy storage and/or renewable energy sources, exemplary network models for exemplary storage, arbitrage and/or distribution of electricity, including exemplary electricity used for exemplary ancillary services, exemplary methods for demand side management and/or load shifting; and exemplary incorporation of predictive algorithms to the foregoing, and adds in exemplary embodiments, various additional new elements to create an exemplary novel system and method that can improve on exemplary conventional solutions, significantly and substantially. Exemplary improvements of various example embodiments can include, e.g., but are not limited to, the following:

An exemplary multi-stage system and/or method and/or computer program product to be executed on at least one exemplary computer processor, based on an exemplary value hierarchy for optimizing for example, but not limited to, charging, and/or discharging an exemplary battery and/or exemplary other energy storage device(s), taking into account, e.g., but not limited to, exemplary intraday optimization opportunities, exemplary balancing cost savings objectives with maximizing useful life of the exemplary battery and/or other exemplary energy storage device, exemplary aggregation possibilities, exemplary unique single-variable and/or aggregate constraints of exemplary multiple optimization stages, etc., according to an exemplary embodiment.

Exemplary scalability of the exemplary system and/or method, and/or computer program product, and/or for an exemplary network application, in which, e.g., but not limited to, both exemplary common and/or exemplary individual building asset(s) are incorporated and allocation of benefits can occur based on various exemplary different criteria, etc., according to an exemplary embodiment.

Exemplary static and/or exemplary dynamic allocation of exemplary energy storage based on exemplary different values for exemplary different applications, such as, including, e.g., but not limited to, exemplary frequency regulation vs. arbitrage, etc., according to an exemplary embodiment.

Exemplary incorporation of exemplary static loads including, e.g., but not limited to, plug-in hybrid electric vehicle (PHEV) "refueling" with exemplary dynamic load(s)(the building's consumption) into the exemplary optimization calculus, etc., according to an exemplary embodiment.

Exemplary determining and/or exemplary calculating of an exemplary optimal amount of battery and/or solar photovoltaic (PV) capacity to install for an exemplary building and/or other exemplary energy demanding entity, given an exemplary rate structure (e.g., exemplary tariffs and/or exemplary utility pricing), exemplary model availability of photovoltaics (PV) and/or exemplary load profile of the exemplary building and/or energy demanding entity, etc., according to an exemplary embodiment.

Exemplary Embodiment of the Present Invention

An exemplary embodiment of the present invention can include, e.g., but not limited to:

Exemplary synthesized elements of exemplary energy management and/or optimization methods, which may include, e.g., but not limited to, exemplary energy storage and/or renewable energy sources, exemplary network models for exemplary storage, arbitrage and/or distribution of electricity, including exemplary electricity used for exemplary ancillary services, exemplary methods for demand side management and/or load shifting; and exemplary incorporation of predictive algorithms to the foregoing and can add additional new combinations of exemplary elements to create any of various exemplary novel system, method, and/or computer program product embodiments that can provide substantial, significant, exemplary improvements over conventional systems. These exemplary improvements can include, e.g., but are not limited to:

Exemplary determining an exemplary optimal amount of battery, solar photovoltaic (PV), wind, turbine, fuel cell, biomass, waste-to-energy and/or thermal capacity and/or other exemplary energy source, etc., to install for an exemplary building, given the exemplary applicable rate structure, exemplary real-time weather-predicted renewable energy production, and/or exemplary artificial intelligence (AI) predicted load profile of the exemplary building or exemplary entity, and/or also can further include, e.g., but not limited to, improvements by taking into consideration exemplary future energy efficiency improvements, exemplary user inputs on exemplary daily occupancy, exemplary event schedules for each exemplary day or other time period, and exemplary building and/or or other entity participation in exemplary utility services such as, e.g., but not limited to, demand response and/or frequency management, etc. Additionally, exemplary building load impact can also be simulated for exemplary dynamic EV loads based on the exemplary types of vehicles and/or exemplary frequency of charging at specific locations, etc., according to an exemplary embodiment.

Exemplary using an exemplary pre-determined daily schedule of exemplary battery charge/discharge and/or exemplary monitoring charge/discharge on an exemplary real-time basis and/or reducing exemplary building load as needed through exemplary real-time load-shedding, and/or the like. Or in the event the exemplary building load is lower than an exemplary expected demand load, further processing can be undertaken including, e.g., but not limited to, exemplary redistributing excess exemplary battery capacity based on an exemplary formula, according to an exemplary embodiment.

Exemplary turning off of an exemplary electric charging station when the grid load is high and the system determines that the battery charge demand goes beyond a predetermined exemplary established threshold for a given period of time, for example. Through exemplary predictive modeling of the exemplary building and/or entity load, the exemplary system can, e.g., but not limited to, preset an exemplary total amount that the exemplary battery and/or exemplary energy storage device can be discharged during each exemplary 15-minute interval and/or if that exemplary discharge is higher, the exemplary system can perform additional processing including e.g., but not limited to, load shedding—of e.g., but not limited to, EV charging and/or other load centers, etc., according to an exemplary embodiment. An exemplary controller can, e.g., but not limited to, monitor multiple areas of the building and/or load shed, as needed, according to an exemplary embodiment.

Figure 6:
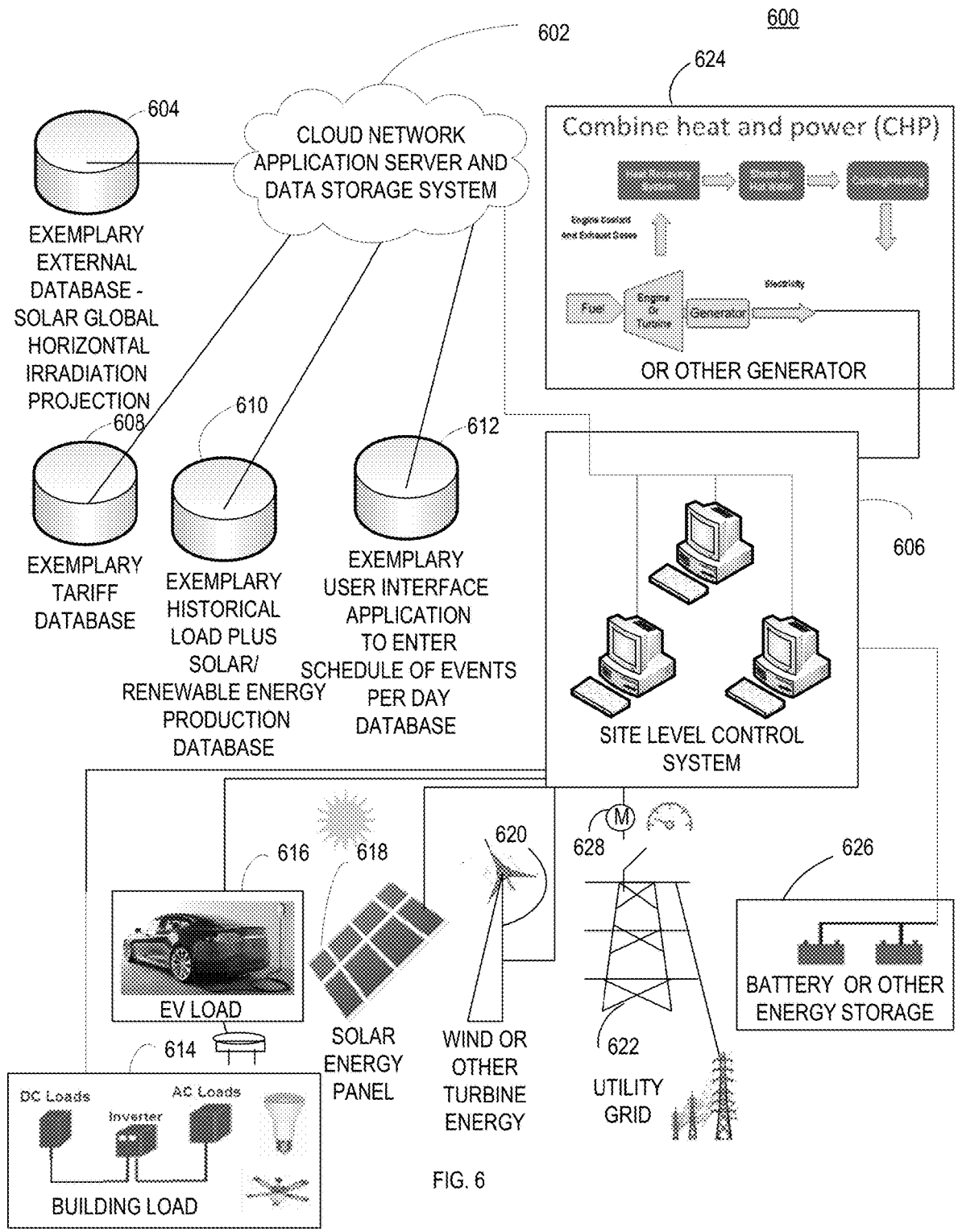
FIG. 6 depicts an exemplary embodiment of an exemplary energy generation and energy storage optimization system including an exemplary but nonlimiting cloud-based server, network and database system for storing exemplary external and exemplary internal energy data including, e.g., but not limited to, exemplary solar global horizontal irradiation projection database, exemplary tariff database, exemplary historical load plus solar production and demand reduction database, exemplary user interface application enabling entry of exemplary schedule of events per day database, exemplary site level control system including exemplary one or more computers and/or networking elements, and/or energy entity interfaces including, e.g., but not limited to, exemplary building load, electric vehicle (EV) load, solar energy generation production, wind, turbine, and/or other renewable energy generation production, utility grid access, CHP, diesel, and/or other generator generation production, and/or battery and/or other energy storage device, etc., according to an exemplary embodiment.

FIG. 6 illustrates an exemplary embodiment of an exemplary block diagram 600 illustrating an exemplary controller 602, 606, which can include, e.g., but not limited to, a cloud-based application server service provider 602, and/or a client controller 606, which can be onsite, in one embodiment, at an exemplary entity such as a home, a school, a university, a hotel, a hospital, an office, or other commercial and/or public and/or private business, according to an exemplary embodiment. The diagram 600 illustrates the controller 602 coupled to an exemplary database 604, which can include exemplary external database content such as, e.g., but not limited to, an exemplary solar global horizontal irradiation projection data, an exemplary tariff database 608, exemplary historical load plus solar production/demand reduction/load shedding preferences database 610, exemplary user interface application to enter a schedule of events for a given time period and the like database 612 including data such as, e.g., but not limited to, an exemplary daily schedule, exemplary utility grid 622 power supply via a meter 628, which can include an intelligent meter, according to an exemplary embodiment to reach energy generation from utility 622 over exemplary conventional powerlines, according to an exemplary embodiment. Controller 602, 606 can be configured to include access to control and/or provide energy to exemplary load devices 616 (exemplary electronic vehicle (EV) load), building entity load 614, exemplary solar panel generation 618, which can include DC based loads and/or AC based loads depending on controller features, according to an exemplary embodiment. Controller 602, 606 can be coupled to exemplary energy storage device 626, in an exemplary embodiment, the energy storage device 626 can be a battery, according to an exemplary embodiment, which can be used to shift energy demand to offpeak, by discharging the battery at peak tariff time periods, and recharging the battery offpeak or using alternative energy generation such as, e.g., but not limited to, solar energy 618 or wind turbine 620, generator 624, or other generator, or other alternative and/or renewable energy. Controller 702 can be further coupled to exemplary energy generation or production devices 714, 720, 724, in exemplary embodiments, the energy generation devices 714, 720, 724 can include, but are not limited to, an exemplary solar panel 618, a solar panel array 618, a turbine generator 620, a combine heat and power (CHP) generator 624 (which can include an exemplary fuel based engine to turn a turbine, which can in turn turn a generator to produce electricity, and its heat can be recovered and can be converted into steam, or hot water, or a turbo charger or supercharger can be provided), or another generator, or other energy generation device such as, e.g., a diesel generator, wind turbine 620, hydroelectric turbine, geothermal energy generator, hydrogen fuel cell, etc., according to an exemplary embodiment.

Using exemplary tariff database 608, the exemplary site controller 606 can receive demand reduction set points, e.g., but not limited to, at beginning of each day/billing period, and an exemplary schedule can be provided, e.g., upfront, an exemplary 1-3 days ahead, according to an exemplary embodiment.

Using exemplary historical load database 610, the exemplary, according to an exemplary embodiment.

Using exemplary historical load plus solar production/demand reduction database 612, the exemplary controller 602, 606 can check the exemplary building entity load and actual solar production of solar panel 618 and can discharge the exemplary battery energy storage device 626 to meet an exemplary demand reduction set point, according to an exemplary embodiment.

Using exemplary user interface application to enter schedule of exemplary events per exemplary day time period database 614, the exemplary controller 606 can continue to monitor battery 626, according to an exemplary embodiment.

Exemplary communication between exemplary site level control system 606 and cloud network and application server and data storage system 602 can be updated from time-to-time, such as, e.g., but not limited to, periodically such as, e.g., every 15 minutes, more frequently, or less frequently, and can send and receive exemplary actual performance data and can be stored in exemplary historical load plus solar/RE production database (DB) 612, according to an exemplary embodiment.

The exemplary cloud network and application server and data storage system 602 can perform various exemplary processing tasks including, e.g., but not limited to, in an exemplary high-level description of exemplary optimization program can include, exemplary program instructions, which can read exemplary historical site level data from database 610 (and/or data that can be simulated according to exemplary embodiments) and can in one exemplary embodiment, use an exemplary predictive analytics, and/or artificial intelligence, and/or machine learning (ML) algorithm and can use data from database 612, which can include exemplary user entered or received exemplary schedule of events data to, e.g., but not limited to, determine an exemplary projected load curve for the exemplary entity (e.g., building) for a given timer period (e.g., the day), according to an exemplary embodiment.

The exemplary high-level description of the exemplary optimization program can further include, exemplary program instructions, which can calculate exemplary projected solar production for the exemplary day time period using exemplary projected global horizontal irradiance (GHI), e.g., from database 604 projection, and/or other renewable energy (RE) generation for the day, according to an exemplary embodiment.

The exemplary high-level description of the exemplary optimization program can further include, exemplary program instructions, which can include using the above information from the prior instructions to, e.g., but not limited to, include, exemplary program instructions, which can calculate exemplary demand reduction (DR) target for the exemplary day time period using exemplary battery energy storage device 626, according to an exemplary embodiment.

The exemplary high-level description of the exemplary optimization program can further include, exemplary program instructions, which can adjust the exemplary demand reduction target on an exemplary time period or after a time duration of, e.g., but not limited to, every 15 minutes, or more, or less often, to, e.g., but not limited to, maximize exemplary demand savings, according to an exemplary embodiment.

According to an exemplary embodiment, the exemplary system 600 can be used to perform individual site level energy analysis for exemplary entities, such as, e.g., but not limited to, small commercial, hotel, and apartment REITs, according to an exemplary embodiment.

According to an exemplary embodiment, the exemplary system 600 can be used to properly size a combination of systems, including, e.g., but not limited to, solar (and/or any number of other energy generation technologies) and energy storage systems such as, e.g., but not limited to, battery systems, which can operate in an exemplary grid-connected or microgrid setting, to produce cost savings and to provide a maximized return on investment in energy system sizing and management to provide an optimal cost saving, energy system for exemplary customers.

According to an exemplary embodiment, the exemplary system 600 can be used to look at historical load and tariff/rate information and can right-size alternative energy generation technologies that can operate behind-the-meter (BTM) to reduce utility bills for customers.

According to an exemplary embodiment, the exemplary system 600 and methods according to the disclosure and claimed inventions can be used size and manage an optimal system, based on the tariff structure provided by the relevant utility, and energy technologies being used, and can also optimize to determine the right demand setpoints for each exemplary time-of-use period that would provide the highest reduction in demand charges over the course of a given period such as, e.g., but not limited to, a year period.

According to an exemplary embodiment, the exemplary system 600 can be used to provide optimal sizing of renewable energy (RE) assets and energy storage devices (i.e., e.g., but not limited to, battery(ies)) in an exemplary grid-connected and/or microgrid that can provide the greatest energy savings and/or lowest levelized cost of electricity (LCOE). According to an exemplary embodiment, the system and method can be arrived at by providing, e.g., but not limited to, exemplary generating of a load curve for each site by looking at exemplary data including, e.g., but not limited to, a historical load curve, any adjustments simulated for future energy efficiency improvements, exemplary electric vehicle (EV) charging profiles, taking into account any exemplary existing on-site energy generation technologies, and/or exemplary weighing impact of participation in any exemplary utility ancillary services programs such as, e.g., but not limited to, demand response (DR) program(s) and/or frequency regulation.

Advantageously, according to an exemplary embodiment, energy analysis is performed at a site level, not at a portfolio level, and is focused on a utility customer, and is optimized for saving utility customers as much cost as possible, and seeks to allow an entity to be able to take advantage of exemplary utility demand response programs, by which a utility will compensate a customer for reducing demand usage of energy services. According to exemplary embodiments, the systems and methods can allow a customer to maximize return on investment in renewable energy or alternative energy system and energy storage device investments, while decreasing peak demand resulting in savings on the customer's utility bills, according to an exemplary embodiment.

Figure 7:
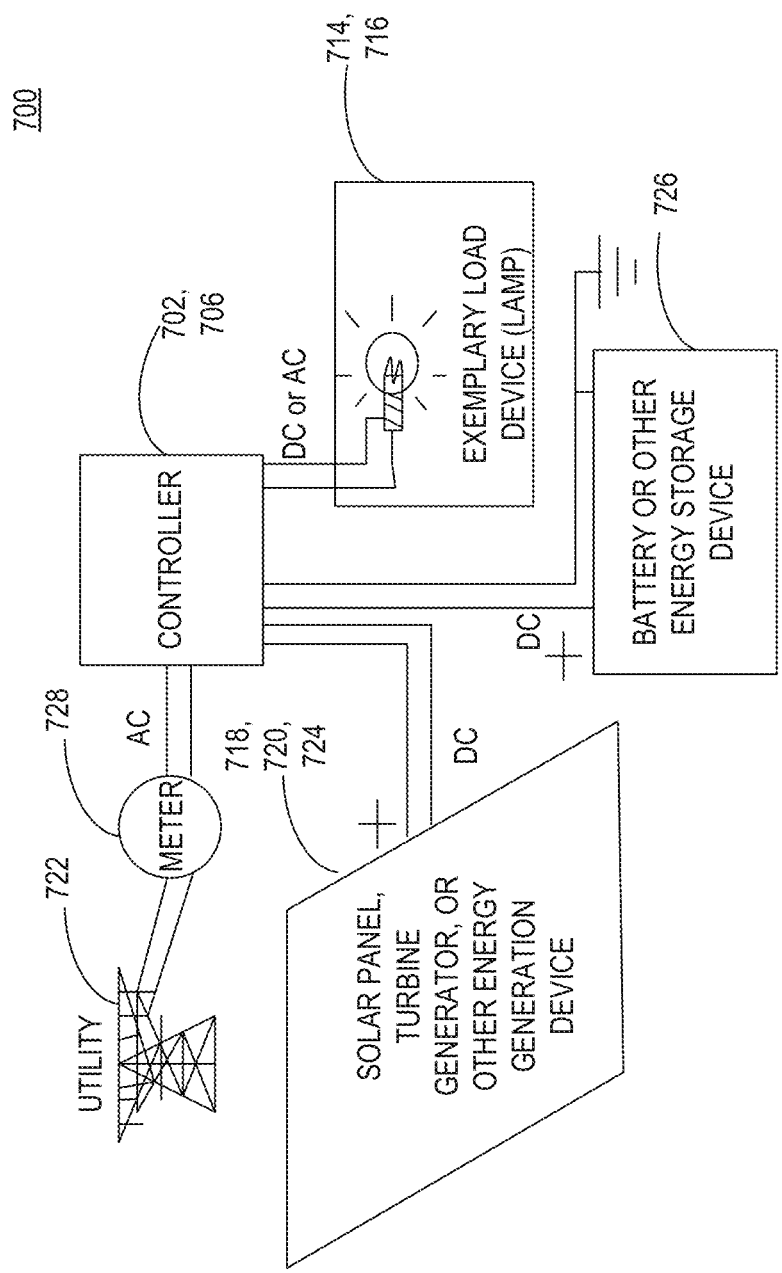
FIG. 7 depicts an exemplary embodiment of an exemplary energy load device such as, e.g., but not limited to, a light bulb, an exemplary energy generation device such as, e.g., but not limited to, a solar panel, an energy generation system, and/or other energy source, etc., and an exemplary energy storage device such as, e.g., but not limited to, a battery, etc., coupled to an exemplary controller device according to an exemplary embodiment.

FIG. 7 illustrates a simplified embodiment of an exemplary block diagram 700 illustrating an exemplary controller 702, 706 which can include, e.g., but not limited to, a cloud-based controller 702, and/or an onsite controller 706, at an entity such as a home, an office, or other commercial business, according to an exemplary embodiment. The diagram 700 illustrates the controller 702 coupled to a utility power supply via a meter 728, which can include an intelligent meter, according to an exemplary embodiment to reach energy generation from utility 722 over conventional powerlines, according to an exemplary embodiment. Controller 702 can be configured to include access to control and/or provide energy to exemplary load devices 714, 716, which can include DC based loads and/or AC based loads depending on controller features, according to an exemplary embodiment. Controller 702 can be coupled to exemplary energy storage device 726, in an exemplary embodiment, the energy storage device 726 can be a battery, according to an exemplary embodiment. Controller 702 can be further coupled to exemplary energy generation or production devices 718, 720, 724, in exemplary embodiments, the energy generation devices 714, 720, 724 can include, but are not limited to, an exemplary solar panel, a solar panel array, a turbine generator, a generator, or other energy generation device such as, e.g., a diesel generator, wind turbine, hydroelectric turbine, geothermal energy generator, hydrogen fuel cell, etc., according to an exemplary embodiment.

Figure 2:
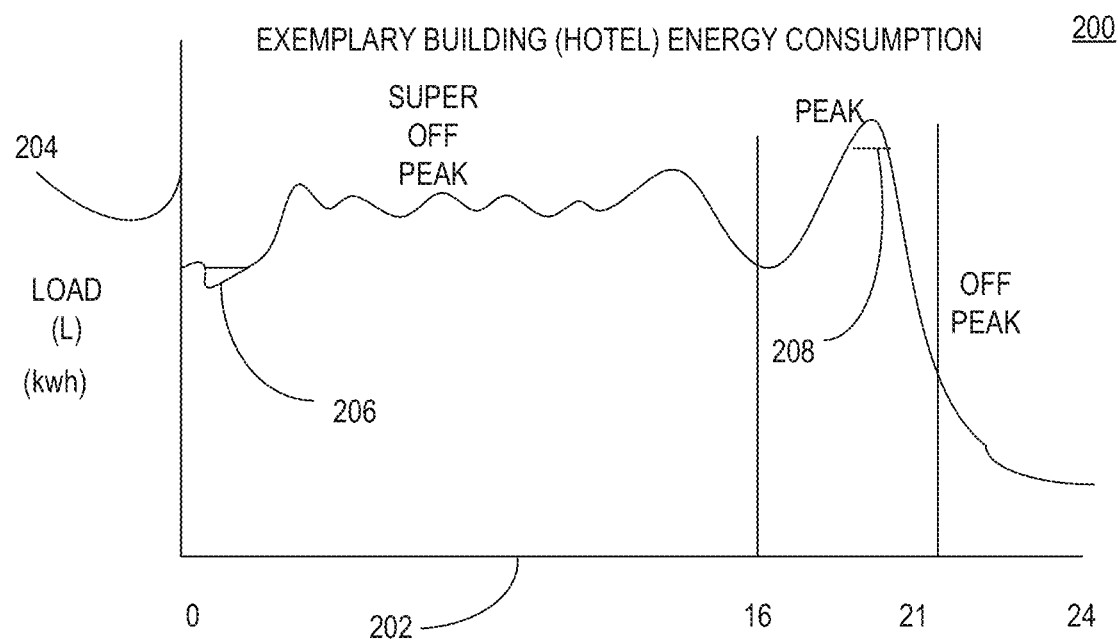
FIG. 2 depicts an exemplary embodiment of a load diagram illustrating an exemplary embodiment of an exemplary entity (e.g., but not limited to, building, home, office, commercial entity, and/or hotel, etc.) energy consumption load curve illustrating exemplary energy consumption, and illustrating exemplary opportunity to shift demand using, e.g., but not limited to, an exemplary energy storage device (e.g., but not limited to, battery, etc.) to charge off peak, to use stored energy by discharging during peak pricing to reduce overall energy costs, according to an exemplary embodiment.
Figure 3:
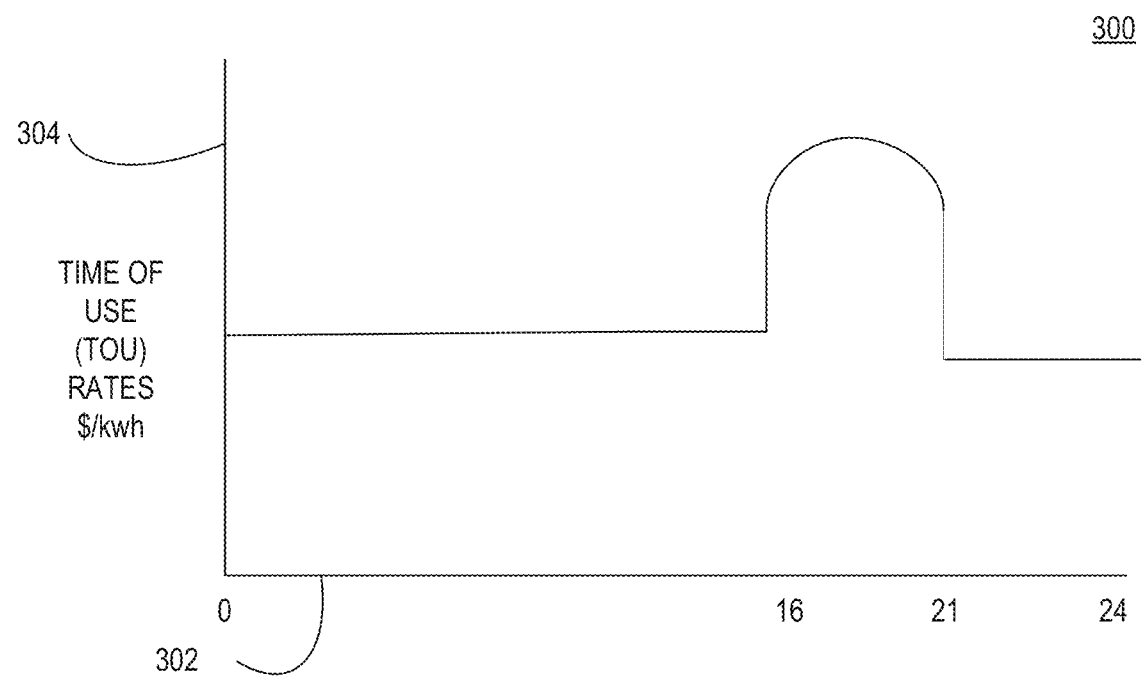
FIG. 3 depicts an exemplary embodiment of a diagram illustrating an exemplary embodiment of a utilities time of use (TOU) tariff rates in an exemplary US$/kwh over the time period of an exemplary day illustrating exemplary increased price per charged/tariffed per kwh by the time of day, examples of tariffs include, e.g., but are not limited to, utility rates, peak rates, midpeak rates, maximum monthly rates, maximum annual rates, feed-in tariffs, tax credits, renewable energy certificates, allowances, etc., according to an exemplary embodiment.

According to an exemplary embodiment, demand reduction target data can be captured and can be used in determining optimal battery sizing, according to an exemplary embodiment. Exemplary optimal energy storage device scaling, and charging and discharging scheduling can be determined, according to an exemplary embodiment. According to an exemplary embodiment, use of optimally sized energy storage devices can be used to avoid paying peak tariffs due to demand spikes, and can allow shifting of energy by discharging energy storage devices such as, e.g., but not limited to, batteries, as illustrated in FIG. 2, to avoid paying peak tariffs, and batteries can be charged offpeak via grid utility offpeak tariffed energy, or via exemplary solar energy during energy generation or production, according to an exemplary embodiment. Exemplary energy generation demand shifting via energy storage devices can be refined via realtime updated scheduling, such as, e.g., but not limited to, using predictive analytic techniques, artificial intelligence (AI) techniques, heuristics, machine learning (ML), neural networks and rules based expert systems, and the like, according to exemplary embodiments. Exemplary energy storage device (e.g., battery) charge/discharge scheduling, can be advantageously at a site-level, and can include continually updated, distributed schedules, distributed from the cloud to distributed site level controller(s), and can provide feedback back to the cloud, and can use an exemplary schedule with an exemplary time period, such as, e.g., but not limited to, an exemplary realtime tracking of battery usage and updating schedule in exemplary, but non-limiting, 15 minute increments, establishing an exemplary 1, 2, 3, 4, or more day, or exemplary preferable about 3-4 day schedule, which can include actual updates based on actual determined load vs. expected schedule, and can in one exemplary embodiment provide an exemplary update every exemplary 15 minute increment, according to one exemplary embodiment.

Figure 8:
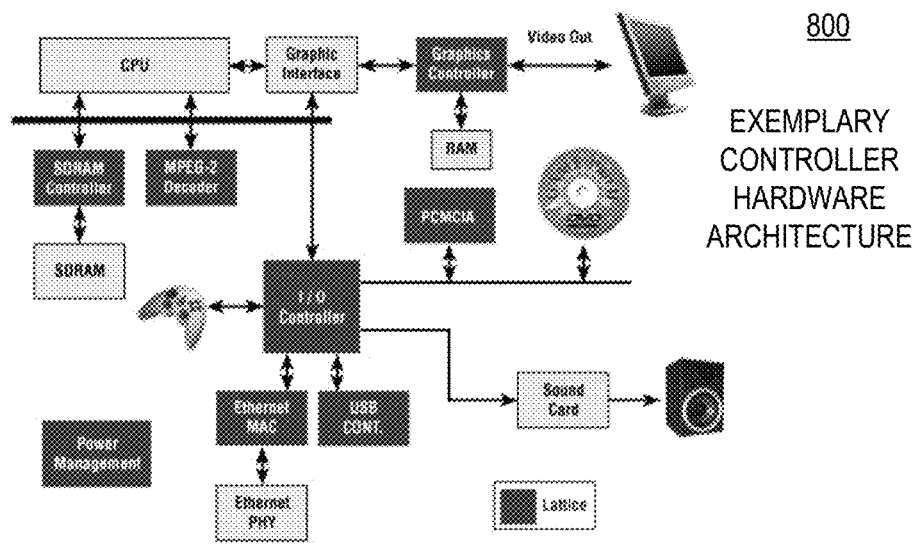
FIG. 8 depicts an exemplary block diagram of an exemplary controller hardware architecture, where the controller can be onsite at a building, according to one exemplary embodiment.

FIG. 8 depicts an exemplary block diagram 800 of an exemplary controller hardware architecture, where the controller can be onsite at a building, according an exemplary embodiment, and can be coupled by a communications facility and/or a network as illustrated and discussed further below with reference to FIG. 9, the exemplary block diagram 800 of an exemplary computer-implemented energy optimization energy storage device sizing and management hardware architecture can include various features, including, but not limited to those depicted according to one exemplary embodiment. FIG. 8, according to an exemplary embodiment can include, e.g., but not limited to, an exemplary CPU(s), coupled to an exemplary output devices such as, e.g., but not limited to, graphic interface to graphics controller, graphics memory and/or graphics I/O, and/or video output, audio output, HDMI, max, mini, etc., display connector, VGA, XGA, SVGA, UHD, 4K, 8K, 16K, 32K, 64K, etc., and/or a storage interface, cable, wired, wireless, a bus, exemplary memory SDRAM and memory controller SDRAM controller, and exemplary MPEG decoder, according to an exemplary embodiment. According to an exemplary embodiment, the exemplary graphic interface can be coupled to one or more I/O controllers for coupling to exemplary interactive elements such as, e.g., but not limited to, a controller input interface such as, e.g., but not limited to, a mouse, keyboard, joystick, stylus, console controller, a Playstation, Xbox, Nintendo Wii, or Switch controllers, and the like, etc., external data and/or plugin capable interfaces such as, e.g., but not limited to, a PCMCIA I, II, III, IV, V, etc. interface, removable or accessible storage devices such as, e.g., but not limited to, a CD-ROM, DVD-ROM/RW, BLURAY, UHD BLURAY, electronic, magnetic, optical, magneto-optical, FLASH SDRAM, DRAM, USB devices, memory card, ETC., memory and/or other storage media, etc., output devices such as, e.g., but not limited to, printer(s), display, display subsystems, sound card interface and/or speakers, headphones, SONOS, wireless audio, BLUETOOTH, WIFI Audio, and/or audio output systems, optical audio, etc., network interface cards (NICs) such as, e.g., but not limited to, Ethernet MAC, Token Ring, Fibre channel, optical fibre network interface, 10/100/and/or 1000, network interfaces, etc., physical interfaces including twisted pair, shielded twisted pair, CableTV, CATV, optical fibre, enhanced shielded ethernet cabling, IBM cabling system, optical fibre multiplexing, routers and/or switches, firewalls, security equipment, cable modems, WIFI modems, WIMAX modems, etc., various ports, parallel, serial, fibre, serial bus, universal serial bus (USB), A, B, C, 1.0, 2.0, 3.0, etc., advanced power management, battery and/or AC power supply, and/or voltage regulation and external alternative power AC, DC, etc., and/or or networking infrastructure, etc.

Figure 9:
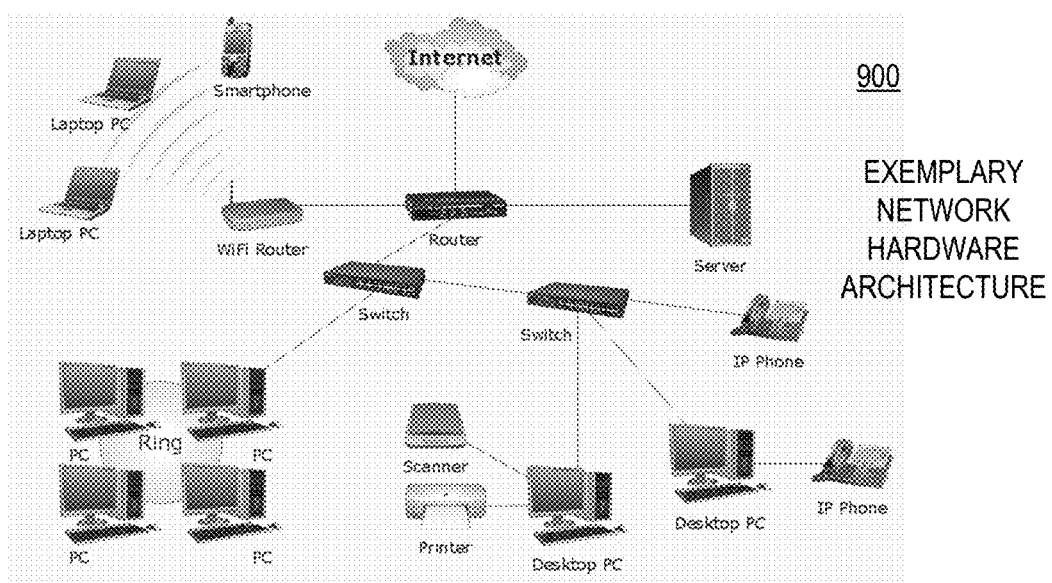
FIG. 9 depicts an exemplary block diagram of an exemplary system network hardware architecture, according to an exemplary embodiment.

FIG. 9 depicts an exemplary block diagram 800 of an exemplary system network hardware architecture, according to an exemplary embodiment. FIG. 9 depicts an exemplary embodiment of a block diagram 900 of an exemplary network hardware architecture, including various exemplary communications network technologies in an exemplary schematic block diagram illustrating exemplary controller systems as can be used in the onsite controller, and/or for coupling to exemplary cloud-based application server(s), and/or database(s), as can be executed on exemplary laptop and/or notebook, desktop, and/or server, computing devices and/or PC and/or mobile devices, wired, and/or wirelessly coupled to an exemplary but nonlimiting WIFI router or the like to an exemplary router for access to other router(s) and/or host(s) on the Internet, and/or servers, and/or clients, and/or peer based devices, and/or Internet of Things (IOT) based appliances, and the like, and/or network switch(es) and/or VoIP devices, and/or IP phones, and/or telephony devices, and/or desktop PCs, server PCs, handheld, laptop, notebook and/or mobile devices, and/or peripheral devices such as, e.g., but not limited to, scanner(s), camera(s), touchscreen(s), other sensors, input devices, mouse, stylus, keypad, keyboard, microphone, output devices, printers, televisions, smartv, monitors, flatscreen, touch-enabled, LCD, LED, OLED, UHD LED, QLED, etc., gateways, gateway switches between alternative network topologies, e.g., ring-based topologies, bus topology, CSMA/CD, packet based, token ring, fibre channel, Microwave, IR, RF, 3G, 4G, 5G, 6G, nG, etc., according to various exemplary embodiments.

Figure 11:
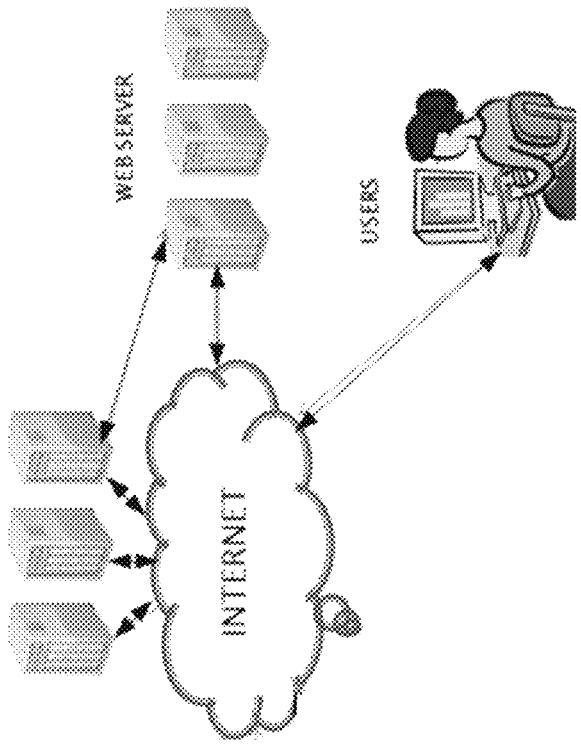
FIGS. 10 and 11 depict an exemplary embodiment of an exemplary cloud-hosted application server system, and an exemplary web browser-based application server exemplary system, respectively, with each providing embodiments of an exemplary computer-implemented energy optimization energy storage device sizing and management system, according to various exemplary embodiments.
Figure 10:
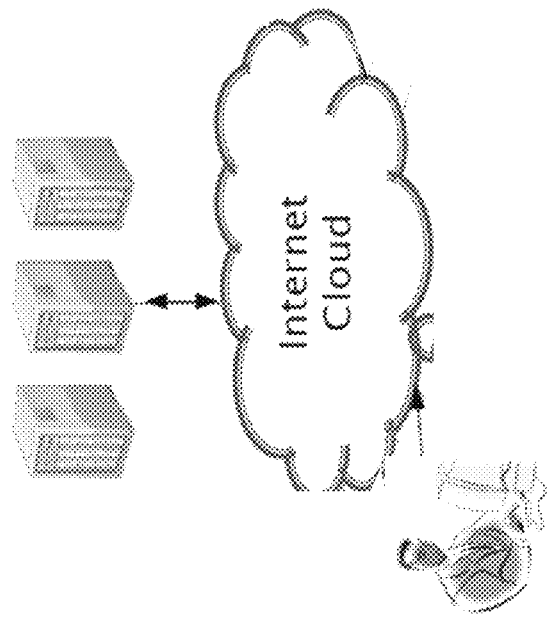

FIGS. 10 and 11 depict an exemplary embodiment of an exemplary cloud-hosted application server system 1000, and an exemplary web browser-based application server exemplary system 1100, respectively, with each providing embodiments of an exemplary computer-implemented energy optimization energy storage device sizing and management system, according to various exemplary embodiments.

Figure 12:
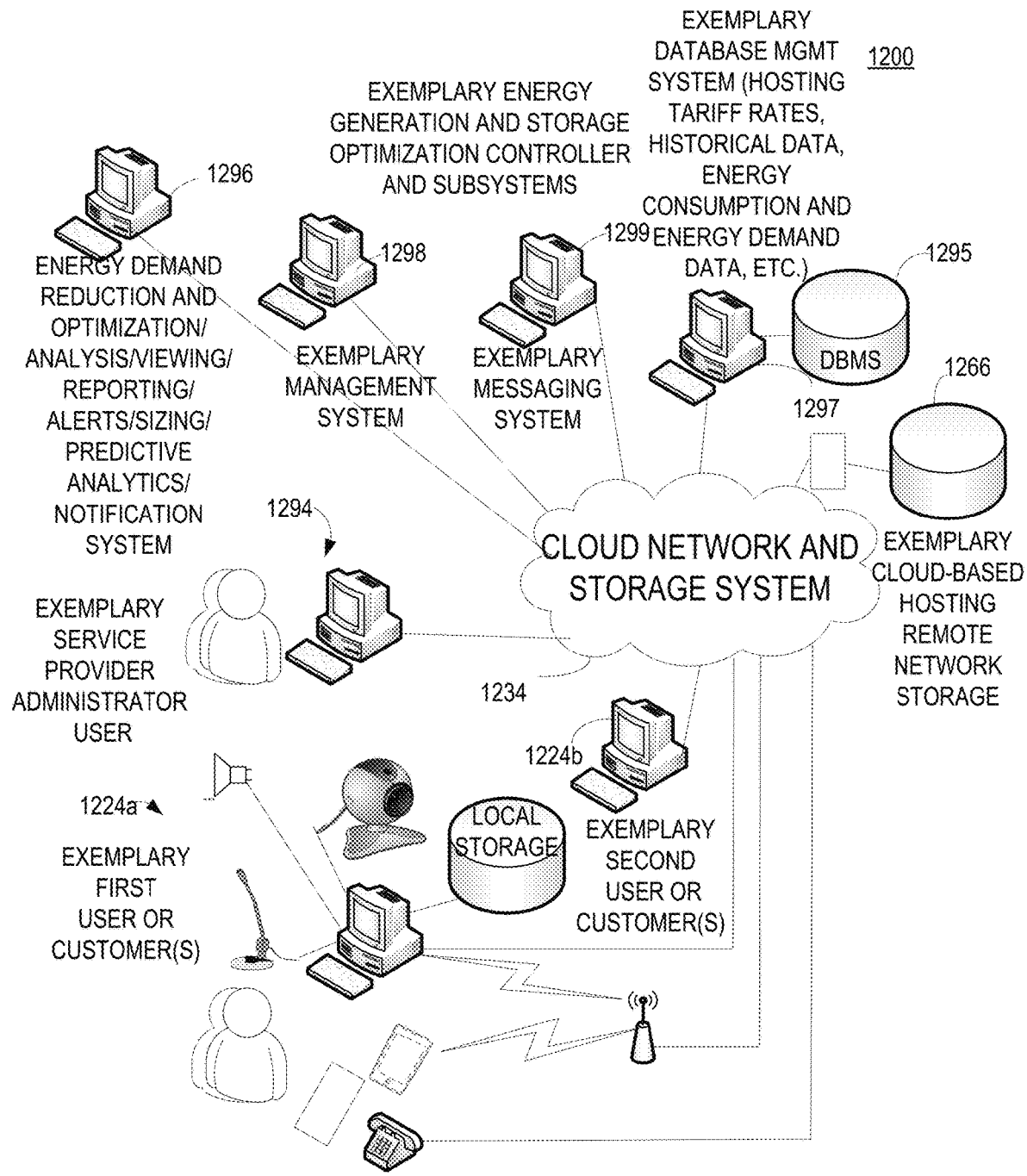
FIG. 12 depicts an exemplary embodiment of an exemplary software as a service (SAAS) based application server offering, providing an embodiment of an exemplary computer-implemented energy optimization energy storage device sizing and management system, according to one exemplary embodiment.

FIG. 12 depicts an exemplary embodiment of an exemplary software as a service (SAAS) based application server offering, providing an embodiment of an exemplary computer-implemented energy optimization energy storage device sizing and management system, and various subsystems of an exemplary service provider, whether cloud-based as illustrated, or otherwise, as will be apparent to those skilled in the art, including e.g., but not limited to, SAAS, client-server based architecture, standalone system, server based, client based, peer-to-peer device based, web-browser, or otherwise, according to one exemplary embodiment. Various users' devices 1224a, 1224b, 1294 coupled via an exemplary cloud network and storage system 1234, to devices 1296, 1298, 1299, 1295, 1297, and 1266.

Figure 13:
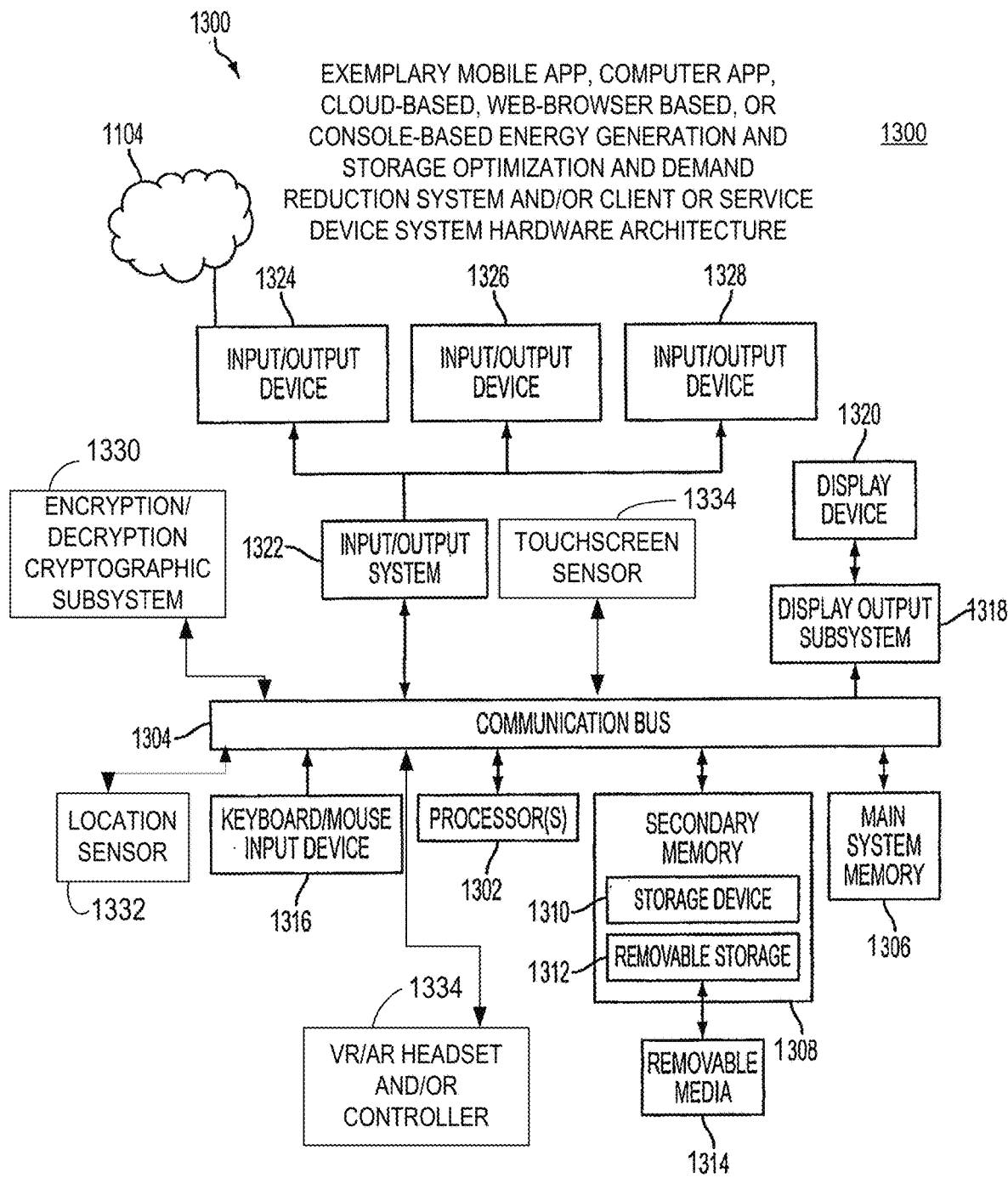
FIG. 13 depicts an exemplary embodiment of a schematic diagram illustrating an exemplary computing and communications system for providing an exemplary mobile app, computer application, and/or console based, computer-implemented energy optimization energy storage device sizing and management system, computing and/or communications device, and/or client, and/or server, and/or service provider device system hardware architecture, according to one exemplary embodiment.

FIG. 13 depicts an exemplary embodiment of a schematic diagram 1300 illustrating an exemplary computing and communications system 1300 for providing an exemplary mobile app, computer application, and/or console based, computer-implemented energy optimization energy storage device sizing and management system, computing and/or communications device, and/or client, and/or server, and/or service provider device system hardware architecture, according to one exemplary embodiment, where the exemplary block diagram 1300 can include, e.g., an illustration of an exemplary computer system as can be used in an exemplary personal computer application, controller-based console, web-browser based application, augmented reality system, and/or virtual reality based system, each providing exemplary embodiments of an exemplary computer-implemented energy optimization energy storage device sizing and management system according to an exemplary embodiment of the present invention.

Figure 4:
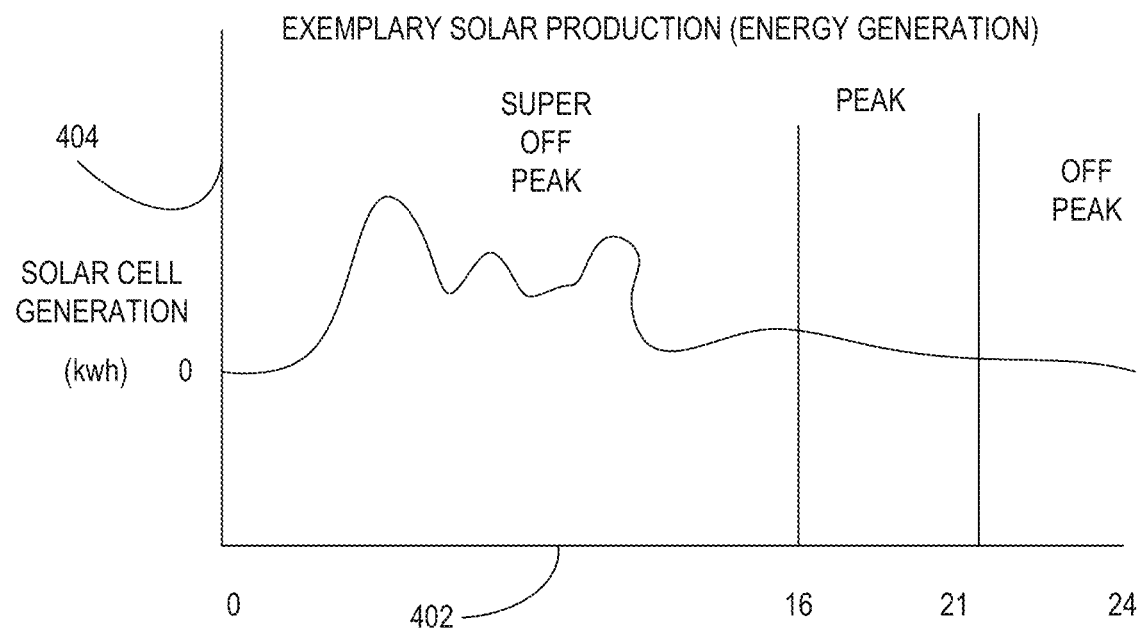
FIG. 4 depicts an exemplary embodiment of a diagram illustrating an exemplary embodiment of solar energy production, i.e., exemplary energy generation over the course of an exemplary day, as may vary with exemplary weather conditions, etc., illustrating kwh energy generation and noting timing relative to utility peak pricing periods, charting exemplary energy (in kwh) generated over the time periods of an exemplary day, examples include, e.g., but not limited to, PV, solar panels, a wind turbine, a diesel generator, a hydrogen fuel cell, geothermal heat exchanger, grid-attached and non-grid attached energy source, fuel cell, turbine, solar, alternative, renewable energy production system, generator, etc., according to an exemplary embodiment.
Figure 5:
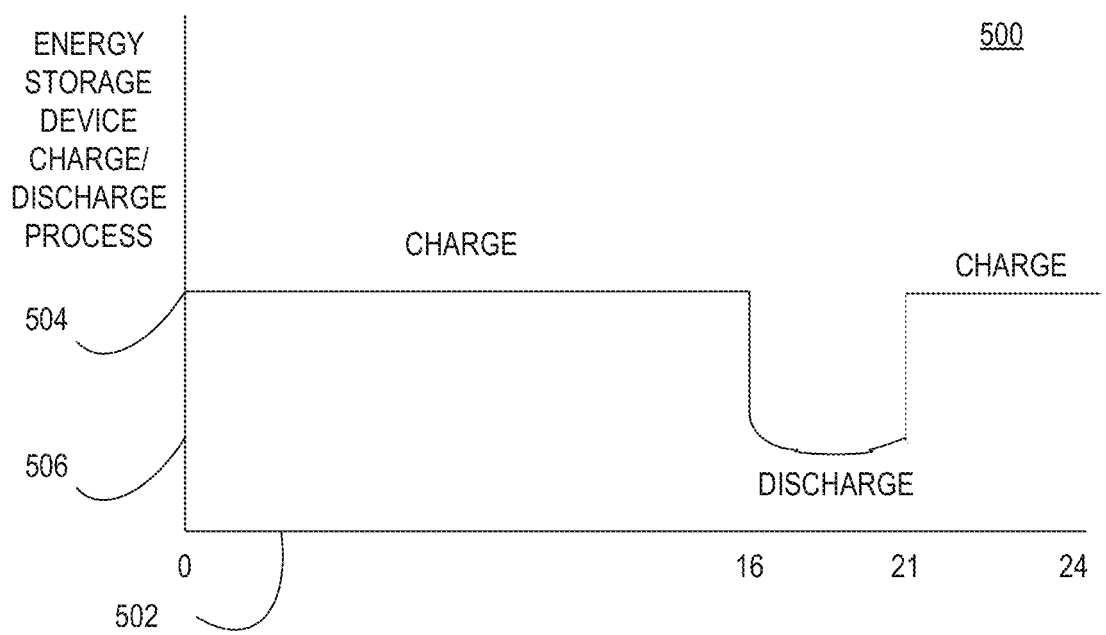
FIG. 5 depicts an exemplary embodiment of a diagram illustrating an exemplary embodiment of an exemplary charging and discharging cycle of an exemplary energy storage device such as, e.g., but not limited to, an energy storage battery, etc. as may be used for shifting energy over a time period of an exemplary day, according to an exemplary embodiment.

FIG. 13 depicts an exemplary embodiment of a block diagram 1300 illustrating an exemplary embodiment of a computer system 102, 106 that may be used in conjunction with any of the systems depicted in diagram 100 of FIG. 1 or hardware layer 202 of diagram 200 of FIG. 2. Further, computer system 102, 106 of block diagram 1300 may be used to execute any of various methods and/or processes such as, e.g., but not limited to, those discussed below with reference to FIGS. 4, 5, and 6. FIG. 13 depicts an exemplary embodiment of a computer system 102, 106 that may be used in computing devices such as, e.g., but not limited to, client 106 and/or server 102 computing devices according to an exemplary embodiment of the present invention. FIG. 13 depicts an exemplary embodiment of a computer system that may be used as client device 106, or a server device 102, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 1300 is shown in FIG. 13, depicting an exemplary embodiment of a block diagram of an exemplary computer system useful for implementing the present invention. Specifically, FIG. 13 illustrates an example computer 1300, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® 10/7/95/NT/98/2000/XP/CE/, etc. available from MICROSOFT® Corporation of Redmond, Wash., U.S.A., SOLARIS® from SUN® Microsystems, now Oracle Corporation, previously of Santa Clara, Calif., U.S.A., OS/2 from IBM® Corporation of Armonk, N.Y., U.S.A., Mac/OS, OSX, iOS from APPLE® Corporation of Cupertino, Calif., U.S.A., etc., ANDROID available from GOOGLE, a division of ALPHABET CORPORATION of Palo Alto, Calif., USA, or any of various versions of UNIX® (a trademark of the Open Group of San Francisco, Calif., USA) including, e.g., LINUX®, UBUNTU, BSD UNIX, DEBIAN, HPUX®, IBM AIX®, Sun Solaris, GNU/Linux, MacOS X, Debian, Minix, V7 Unix, FreeBSD, Kernel, Android, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 1300 is shown in FIG. 13. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, augmented reality devices (AR), virtual reality (VR) devices, etc., may also be implemented using a computer such as that shown in FIG. 13.

The computer system 1300 may include one or more processors, such as, e.g., but not limited to, processor(s) 1302. The processor(s) 1302 may include, a microprocessor, nanoprocessor, quantum computer, any of various conventional digital architecture processors including, e.g., but not limited to, Pentium, CORE i7, i5, i3, i9, etc., ARM, CISC, RISC, POWER, multi-processor, and/or multi-core, quad-core, etc., field programmable gate array (FPGA), application specific integrated circuit (ASIC), cryptographic processor, cryptographic subsystem, a system on a chip (SOC), etc., may be coupled or connected to a communication infrastructure 1304 (e.g., but not limited to, a communications bus, a backplane, a mother board, a cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 1300 may include a display interface 1318 that may forward, e.g., but not limited to, graphics, text, and other data, etc., from the communication infrastructure 1304 (or from a frame buffer, etc., not shown) for display on the display unit 1320.

The computer system 1300 may also include, e.g., but may not be limited to, a main memory 1306, which may include, e.g., but not limited to, random access memory (RAM), volatile and nonvolatile, synchronous digital (SDRAM), flash memory, and/or a secondary memory 1308, etc. The secondary memory 1308 may include, for example, (but not limited to) a storage device 1310 such as, e.g., but not limited to, a hard disk drive and/or a removable storage drive 1312, representing, e.g., but not limited to, a floppy diskette drive, a magnetic tape drive, an optical disk drive, a compact disk (CD-ROM) device, write once read many (WORM), Read Write (RW), Read (R), a magneto-optical (MO) drive, a digital versatile disk (DVD) device, BLU-RAY, and/or other Digital Storage Disk, electronic, magnetic, optical, magneto-optical, and/or optical storage device, etc. The removable storage drive 1312 may, e.g., but not limited to, access, read from and/or write to a removable storage unit 1314 in a well known manner. Removable storage media unit 1314, may also be called a program storage device or a computer program product, and may represent, e.g., but not limited to, a floppy disk, magnetic tape, optical disk, CD-ROM disk, a MO media, a DVD disk, FLASH MEMORY, USB stick, SDRAM, memory device, etc. which may be accessed, read from, and/or written to by removable storage drive 1312. As will be appreciated, the removable storage unit 1314 may include, e.g., but not limited to, a computer usable storage medium having stored therein computer software and/or data.

In alternative exemplary embodiments, secondary memory 1308 may include other similar devices for allowing computer programs or other instructions to be loaded into computer system 1300. Such devices may include, for example, a removable storage unit 1314 and a storage subsystem interface adapter (not shown.) Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM), SDRAM, FLASH, and/or associated socket, and/or storage and/or processing and/or memory, and/or integrated devices, and/or other removable storage units 1314 and interfaces, which may allow software and data to be transferred from the removable storage unit 1314 to computer system 1300.

Computer 1300 may also include, e.g., but not limited to, an input device 1316 such as, e.g., (but not limited to) a mouse or other pointing device such as a digitizer, and/or a keyboard or other data entry device (not separately labeled).

Computer 1300 may also include, e.g., but not limited to, output devices 1320, such as, e.g., (but not limited to) display, touchscreen, touch sensor, proximity sensory, printers, and output subsystem display interface 1318.

Computer 1300 may also include, e.g., but not limited to, input/output (I/O) system 1322 such as, e.g., (but not limited to) a communications interface, a cable and communications path, (not separately shown) etc., as well as I/O devices 1324, 1326, 1328, for example. These devices 1324, 1326, 1328, may include, e.g., but not limited to, a network interface card, and modems (not separately labeled). The communications interface may allow software and data to be, e.g., transferred between computer system 1300 and external devices over a network 104, as shown. Examples of the communications interface may include, e.g., but may not be limited to, a modem, a network interface (such as, e.g., an Ethernet card), a communications port, a Personal Computer Memory Card International Association (PCMCIA) or PC-Card slot and card, etc. Software and data transferred via communications interface may be in the form of signals 1330 (not shown) which may be electronic, electromagnetic, optical or other signals capable of being received by communications interface. These signals 1330 may be provided to communications interface via, e.g., but not limited to, a communications path (e.g., but not limited to, a channel). This channel may carry signals, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 1314, a hard disk installed in storage device 1310, and signals 1330, etc. These computer program products may provide software to computer system 1300. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose 'device' selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others, when in a nonvolatile form.

Computer programs (also called computer control logic), may include object oriented computer programs, and may be stored in main memory 1306 and/or the secondary memory 1308 and/or removable storage media units 1314, also called computer program products. Such computer programs, when executed, may enable the computer system 1300 to perform the features of the present invention as discussed herein. In particular, the computer programs, when executed, may enable the processor 1302 to provide a method to resolve conflicts during data synchronization according to an exemplary embodiment of the present invention. Accordingly, such computer programs may represent controllers of the computer system 1300.

In another exemplary embodiment, the invention may be directed to a computer program product comprising a computer readable medium having control logic (computer software) stored therein. The control logic, when executed by the processor 1302, may cause the processor 1302 to perform the functions of the invention as described herein. In another exemplary embodiment where the invention may be implemented using software, the software may be stored in a computer program product and loaded into computer system 1300 using, e.g., but not limited to, removable storage drive 1312, storage device 1310 or communications interface, etc. The control logic (software), when executed by the processor 1302, may cause the processor 1302 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium May include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G, 4G, 5G, 6G, 7G, nG wireless, BLUETOOTH, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB), etc.

BLUETOOTH is an emerging wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11 a, b, d and g, (including, e.g., but not limited to IEEE 802.11g—2003, etc.), 802.16, Wi-Max, etc.

An exemplary computer-implemented energy optimization energy storage device sizing and management system service provider system can include computer-implemented method of electronically sizing, electronically managing, and electronically hosting exemplary computer-implemented energy optimization energy storage device sizing and management systems and of providing in one exemplary embodiment, and access to devices, via, e.g., an exemplary communications network to a plurality of electronic computing devices configured as set forth in the claims, and can include various inputs and/or outputs including any of various sensors including, e.g., but not limited to, touch screens, touch sensors, pressure sensors, accelerometers, location sensors, energy based sensors, zygbee devices, intelligent devices, Internet of Things (iOT) devices, etc., data database collection sensor/gatherers, system service provider datasets, data sensors, utility pricing data, blockchain components, encrypted cryptographically protected user information and account user passwords, and/or other private data, distributed ledgers, etc. Specifically, FIG. 13 illustrates an example computer-implemented energy optimization energy storage device sizing and management system system service provider computer 1300, which in an exemplary embodiment may be, e.g., (but not limited to) a exemplary computer-implemented energy optimization energy storage device sizing and management system service provider personal computer (PC) system in one exemplary embodiment, running an operating system such as, e.g., (but not limited to) MICROSOFT® WINDOWS® 10/8.1/8/7/NT/98/2000/XP/CE/ME/VISTA/Windows 10, etc. available from MICROSOFT® Corporation of Redmond, Wash., U.S.A. However, the invention may not be limited to these platforms. Instead, the invention may be implemented on any appropriate exemplary computer-implemented energy optimization energy storage device sizing and management system service provider computer system running any appropriate operating system such as, e.g., but not limited to, Mac OSX, a Mach system, Linux, Ubuntu, Debian UNIX, iOS, OSX+ any variant Debian, Ubuntu, Linux, Android (available from Alphabet, and/or Google), etc., and/or another programming environment such as, e.g., but not limited to, Java, C, C++, C#, Python, Javascript, Ruby on Rails, PHP, LAMP, NDK, HTML, HTML5, XML, ADOBE FLASH, or the like. In one exemplary embodiment, the present invention may be implemented on an exemplary computer-implemented energy optimization energy storage device sizing and management system service provider computer system, including a computer processor, and memory, with instructions stored in the memory configured to be executed on the computer processor, operating as discussed herein. An exemplary computer-implemented energy optimization energy storage device sizing and management system service provider computer system, exemplary computer-implemented energy optimization energy storage device sizing and management system service provider computer 1300 may be shown in FIG. 13. Other components of the invention, such as, e.g., (but not limited to) exemplary computer-implemented energy optimization energy storage device sizing and management system service provider computing device, a communications device, mobile phone, a telephony device, a telephone, a personal digital assistant (PDA), a personal computer (PC), a handheld PC, an interactive television (iTV), a digital video recorder (DVD), a tablet computer, an iPad, an iPhone, an Android phone, a Phablet, a mobile device, a smartphone, a wearable device, a network appliance, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 13. Services may be provided on demand using, e.g., but not limited to, an interactive television (iTV), a video on demand system (VOD), and via a digital video recorder (DVR), or other on demand viewing system.

The exemplary computer-implemented energy optimization energy storage device sizing and management system service provider computer system 1300 may include one or more processors, such as, e.g., but not limited to, processor(s) 1304 such as, e.g., but not limited to, a CORE i7, or the like, Pentium, QuadCore, Multiprocessor, SOC, Microcontroller, Programmable Logic Controller (PLC), microprocessor, nanoprocessor, quantum computer, etc. The exemplary computer-implemented energy optimization energy storage device sizing and management system service provider processor(s) 1304 may be connected and/or coupled to a communication infrastructure 1306 (such as, e.g., but not limited to, a communications bus, cross-over bar, or network, etc.). Various exemplary software embodiments may be described in terms of this exemplary computer-implemented energy optimization energy storage device sizing and management system service provider computer system. After reading this description, it may become apparent to a person skilled in the relevant art(s) how to implement the invention using other exemplary computer-implemented energy optimization energy storage device sizing and management system service provider computer systems and/or architectures. According to an exemplary embodiment, the system can include an exemplary computer-implemented energy optimization energy storage device sizing and management system service provider and data transformer 1334. In an exemplary embodiment, a cryptographic controller 1330 can be included, in an exemplary embodiment, and can be used to, e.g., but not limited to, authenticate a user device, and/or provide encryption and/or decryption processing, according to an exemplary embodiment.

Exemplary computer-implemented energy optimization energy storage device sizing and management system service provider computer system 1300 may include a display interface 1302 that may forward, e.g., but not limited to, graphics, text, and other data, etc., from the communication infrastructure 1306 (or from a frame buffer, etc., not shown) for display on the display unit 1320, or other output device 1318, 1334, 1320, 1334 (such as, e.g., but not limited to, a touchscreen, etc.).

The exemplary computer-implemented energy optimization energy storage device sizing and management system service provider computer system 1300 may also include, e.g., but may not be limited to, a main memory 1306, random access memory (RAM), and a secondary memory 1308, etc. The secondary memory 1308 may include, for example, (but not limited to) a hard disk drive 1310 and/or a removable storage drive 1312, representing a floppy diskette drive, a magnetic tape drive, an optical disk drive, a compact disk drive CD-ROM, etc. The removable storage drive 1312 may, e.g., but not limited to, read from and/or write to a removable storage unit 1312 in a well known manner. Removable storage unit 13122, 1314, also called a program storage device or a computer program product, may represent, e.g., but not limited to, a floppy disk, magnetic tape, solid state disc (SSD), SDRAM, Flash, a thumb device, a USB device, optical disk, compact disk, etc. which may be read from and written to by removable storage drive or media 1314. As may be appreciated, the removable storage unit 1312, 1314 may include a computer usable storage medium having stored therein computer software and/or data. In some embodiments, a "machine-accessible medium" may refer to any storage device used for storing data accessible by a computer. Examples of a machine-accessible medium may include, e.g., but not limited to: a magnetic hard disk; a floppy disk; an optical disk, like a compact disk read-only memory (CDROM) or a digital versatile disk (DVD); a magnetic tape; and/or a memory chip, etc. Communications networking subsystem can be coupled to an electronic network coupled to a data provider, various secure connections allowing electronic receipt of data, and transfer of data to partner systems.

In alternative exemplary embodiments, secondary memory 1308 may include other similar devices for allowing computer programs or other instructions to be loaded into computer system 1300. Such devices may include, for example, a removable storage unit 1314 and an interface 1320. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 1322 such as, e.g., but not limited to, SDRAM, Flash, a thumb device, a USB device, and interfaces 1320, which may allow software and data to be transferred from the removable storage unit 1322 to computer system 1300.

Exemplary computer-implemented energy optimization energy storage device sizing and management system service provider computer 1300 may also include an input device 1316, 1334 such as, e.g., (but not limited to) a mouse or other pointing device such as a digitizer, and a keyboard or other data entry device (not shown), or an input sensor device 1332, location sensor and/or other sensor 1332, such as, e.g., but not limited to, a touch screen, a pressure sensor, an accelerometer, and/or other sensor device such as, e.g., a pressure sensor, a rangefinder, a compass, a camera, accelerometer, gyro, ultrasonic, biometric, secure authentication system, etc.

Exemplary computer-implemented energy optimization energy storage device sizing and management system service provider computer 1300 may also include output devices, such as, e.g., (but not limited to) display 1330, and display interface 1302, or other output device 1340, 1320, Augmented Reality, Virtual Reality device 1334, touchscreen 1336. Exemplary computer-implemented energy optimization energy storage device sizing and management system service provider computer 1300 may include input/output (I/O) devices such as, e.g., (but not limited to) sensors, touch sensitive, pressure sensitive input systems, accelerometers, and/or communications interface 1324, cable 1328 and communications path 1326, etc. These communications networking devices may include, e.g., but not limited to, a network interface card, and modems (neither are labeled).

From a data model, which can automate the process of creating an exemplary computer-implemented energy optimization energy storage device sizing and management system service provider computer system 1354, can process incoming electronic data and can transform the data into exemplary computer-implemented energy optimization energy storage device sizing and management system pages, and/or related social media posts, and can then provide the transformed data, in the form of data indicative of the one or more exemplary computer-implemented energy optimization energy storage device sizing and management system, posts relating to exemplary computer-implemented energy optimization energy storage device sizing and management system posts, cumulative exemplary computer-implemented energy optimization energy storage device sizing and management system goals, exemplary computer-implemented energy optimization energy storage device sizing and management system amounts, electronic database, and electronic funds process and disbursement information, and processing to initiate electronic disbursement, and can be provided to an electronic decision support system (DSS) 1358, and/or computer database management system (DBMS) 1360 (which can be a relational database, and/or can use a graph database, an SQL database, a noSQL database, and/or other social networking and/or graph database, and/or electronic interactive, graphical user interface (GUI) system 1362 (not shown). Each of the exemplary DSS 1358, DBMS 1360 and/or EIGUI system 1362, can then, using e.g., but not limited to, a cryptographic processor and/or a crypto chip controller, or the like, can then encrypt the data using electronic encryptor 1364, which can make use of one or more cryptographic algorithm electronic logic 1366, which can include encryption code, a cryptographic combiner, etc., and may be stored in encrypted form, according to an exemplary embodiment, in a computer database storage facility, from computer database storage device 1368, and from there the process can continue with use of the cryptographic algorithm electronic logic 1370, and electronic decryptor 1372, which can decrypt and/or provide a process for decrypting encrypted data, and/or by providing such data to the DSS 1358, the DBMS 1360, or the EIGUI 1362, if authorized (not shown). By using encryption/decryption, certain algorithms can be used, as described above, including, e.g., but not limited to, AES encryption, RSA, PKI, TLS, FTPS, SFTP, etc. and/or other cryptographic algorithms and/or protocols.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An exemplary computer-implemented energy optimization energy storage device sizing and management system service provider processing can include algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it may be appreciated that throughout the specification discussions utilizing terms such as, e.g., but not limited to, "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term exemplary computer-implemented energy optimization energy storage device sizing and management system service provider "system" or "processor" "system on a chip" "microcontroller" "multi-core" may refer to any device or portion of a device that processes electronic data from registers and/or memory to transform that electronic data into other electronic data that may be stored in registers and/or memory. An exemplary computer-implemented energy optimization energy storage device sizing and management system service provider "computing platform" may comprise one or more processors.

Embodiments of the present invention may include exemplary computer-implemented energy optimization energy storage device sizing and management system service provider apparatuses for performing the operations herein. An apparatus may be specially constructed for the desired purposes, selectively activated or reconfigured by an exemplary computer-implemented energy optimization energy storage device sizing and management system service provider program stored in the device in coordination with one or more special purpose data sensors.

In yet another exemplary embodiment, the invention may be implemented using a combination of any of, e.g., but not limited to, hardware, firmware and software, etc.

In one or more embodiments, the present embodiments are embodied in machine-executable instructions. The instructions can be used to cause exemplary computer-implemented energy optimization energy storage device sizing and management system service provider processing device, for example a special-purpose exemplary computer-implemented energy optimization energy storage device sizing and management system service provider processor, which is programmed with the exemplary computer-implemented energy optimization energy storage device sizing and management system service provider instructions, to perform the steps of the present invention. Alternatively, the steps of the present invention can be performed by specific exemplary computer-implemented energy optimization energy storage device sizing and management system service provider hardware components that contain hardwired logic for performing the steps, or by any combination of programmed computer components and custom hardware components. For example, the present invention can be provided as exemplary computer-implemented energy optimization energy storage device sizing and management system service provider computer program product, as outlined above. In this environment, the embodiments can include a machine-readable medium having exemplary computer-implemented energy optimization energy storage device sizing and management system service provider instructions stored on it. The exemplary computer-implemented energy optimization energy storage device sizing and management system service provider can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

Exemplary wireless protocols and technologies used by a communications network may include BLUETOOTH, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

The embodiments may be employed across different generations of exemplary special purpose index construction wireless devices. This includes 1G-5G according to present paradigms. 1G refers to the first generation wide area wireless (WWAN) communications systems, dated in the 1970s and 1980s. These devices are analog, designed for voice transfer and circuit-switched, and include AMPS, NMT and TACS. 2G refers to second generation communications, dated in the 1990s, characterized as digital, capable of voice and data transfer, and include HSCSD, GSM, CDMA IS-95-A and D-AMPS (TDMA/IS-136). 2.5G refers to the generation of communications between 2G and 3 G. 3G refers to third generation communications systems recently coming into existence, characterized, for example, by data rates of 144 Kbps to over 2 Mbps (high speed), being packet-switched, and permitting multimedia content, including GPRS, 1.times.RTT, EDGE, HDR, W-CDMA. 4G refers to fourth generation and provides an end-to-end IP solution where voice, data and streamed multimedia can be served to users on an "anytime, anywhere" basis at higher data rates than previous generations, and will likely include a fully IP-based and integration of systems and network of networks achieved after convergence of wired and wireless networks, including computer, consumer electronics and communications, for providing 100 Mbit/s and 1 Gbit/s communications, with end-to-end quality of service and high security, including providing services anytime, anywhere, at affordable cost and one billing. 5G refers to fifth generation and provides a complete version to enable the true World Wide Wireless Web (WWWW), i.e., either Semantic Web or Web 3.0, for example. Advanced technologies may include intelligent antenna, radio frequency agileness and flexible modulation are required to optimize ad-hoc wireless networks.

Furthermore, the exemplary computer-implemented energy optimization energy storage device sizing and management system service provider processes and processors need not be located at the same physical locations. In other words, each processor can be executed at one or more geographically distant processor, over for example, a LAN or WAN connection. A great range of possibilities for practicing the exemplary special purpose index construction embodiments may be employed, using different networking hardware and software configurations from the ones above mentioned. Although described with reference to an application server and/or a web-based browser-enabled environment, such as, e.g., but not limited to, a JAVA environment, the application could also be implemented in a client server architecture, or as a mobile based app running on iOS or Android, or the like, and can interact with a server of exemplary computer-implemented energy optimization energy storage device sizing and management system service provider via communication network technology. Also, it is important to note that reference to an electronic network component, is not to require only electronic components, but could also integrate with other common networking equipment including, e.g, but not limited to, optical networking equipment, optical fiber, ATM, SONET, etc.

According to one exemplary embodiment, the exemplary computer-implemented energy optimization energy storage device sizing and management system service provider can be integrated with mobile devices which can run an exemplary an example graphical user interface (GUI) of an exemplary smartphone, and/or mobile phone, and/or computer application, and/or tablet application, and/or Phablet application, etc., application can transmit and/or receive data to and/or from an example mobile exemplary computer-implemented energy optimization energy storage device sizing and management system application device and/or server, in various embodiments. Various exemplary GUI elements can be provided, including icons and/or buttons, which can provide certain functionality relating to the exemplary computer-implemented energy optimization energy storage device sizing and management system, according to an exemplary embodiment. Various exemplary GUI elements can include exemplary scroll bars for scrolling through exemplary lists of exemplary computer-implemented energy optimization energy storage device sizing and management system features, and/or lists of particular GUI element options, according to an exemplary embodiment. Various exemplary embodiments of the system may include, e.g., but not limited to, enhanced interactive features such as, e.g., but not limited to, Web 2.0, social networking posts and/or friend authentication and sharing features, enhanced security offer and acceptance of authorized user(s), ability to interact with other users in social media posts, enhanced demographically and/or psychographically targeted advertisements and/or content, a graph database based scaleable back office system for managing a large scaleable database of users, and/or social media posts, social media profiles for each user, ability to provide ratings and/or emoji and/or other interaction between users, and/or rating of users, comment posting, sharing, and/or electronically enabled micro-fundraising, and/or donations and/or tracking of funds raised using real currency, and/or foreign currency equivalents, including, e.g., but not limited to, cryptocurrencies, real currencies, electronic ledgers, blockchain ledgers, foreign currencies, mobile currencies, VENMO, PAYPAL, WEPAY, etc., according to various exemplary embodiments.

Figure 14:
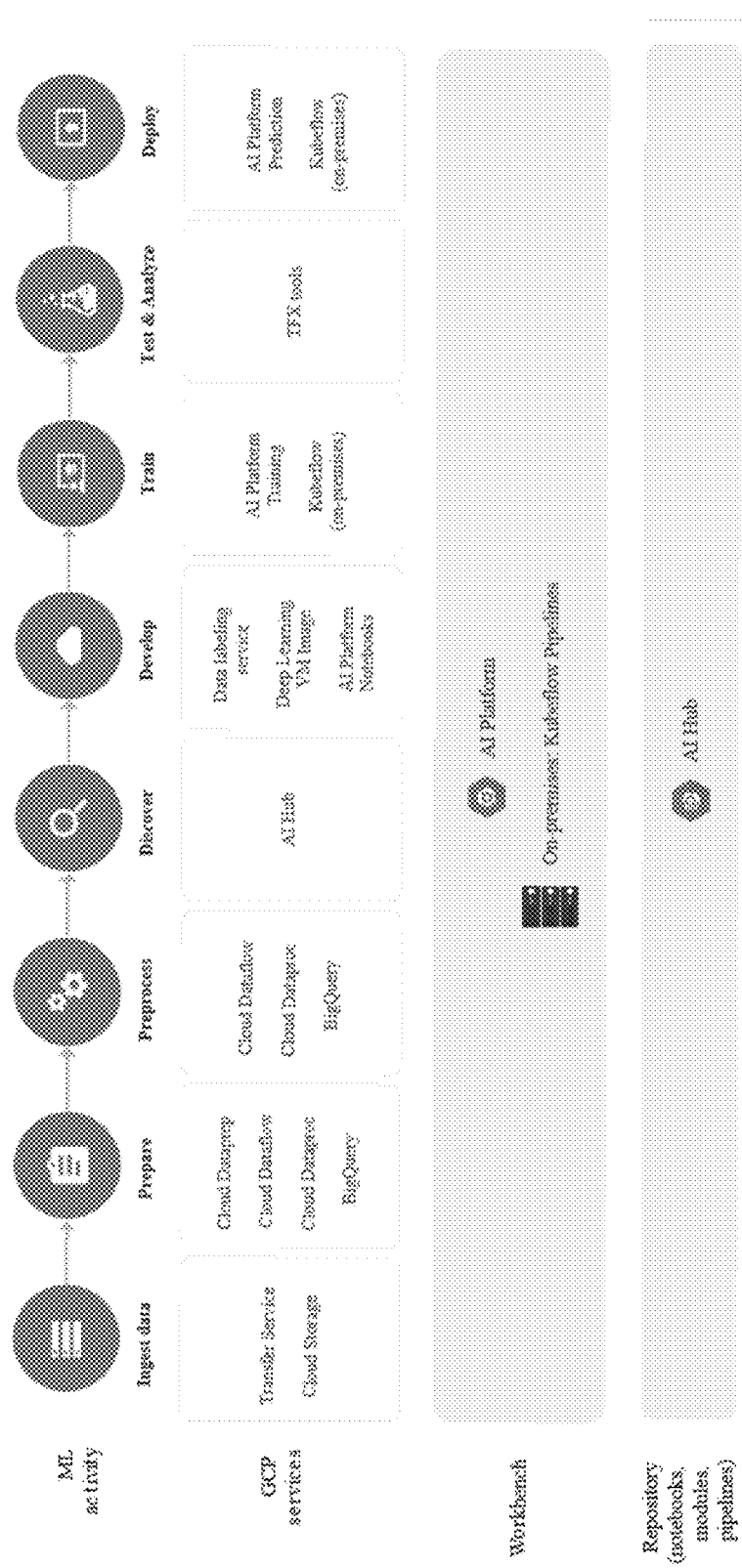
FIG. 14 depicts an exemplary embodiment of an exemplary artificial intelligence (AI) platform, available from GOOGLE, a division of ALPHABET CORPORATION, of Palo Alto, Calif. USA, which is an exemplary, but nonlimiting machine learning (ML) platform enabling development of ML projects from ideation to production and deployment, enabling data engineering, flexibility, and an integrated tool chain for building and running ML predictive analytics applications, supporting a KUBEFLOW open-source platform, allows building portable ML pipelines, which can run on-premises or on cloud without significant code change, and including TENSORFLOW, TPUs, and TFX tools as enabling deployment of production AI applications, according to an exemplary embodiment.

FIG. 14 depicts an exemplary embodiment of a block diagram 1400 of an exemplary computer-implemented energy optimization energy storage device sizing and management system GOOGLE machine learning (ML) software architecture, according to an exemplary embodiment.

Figure 15:
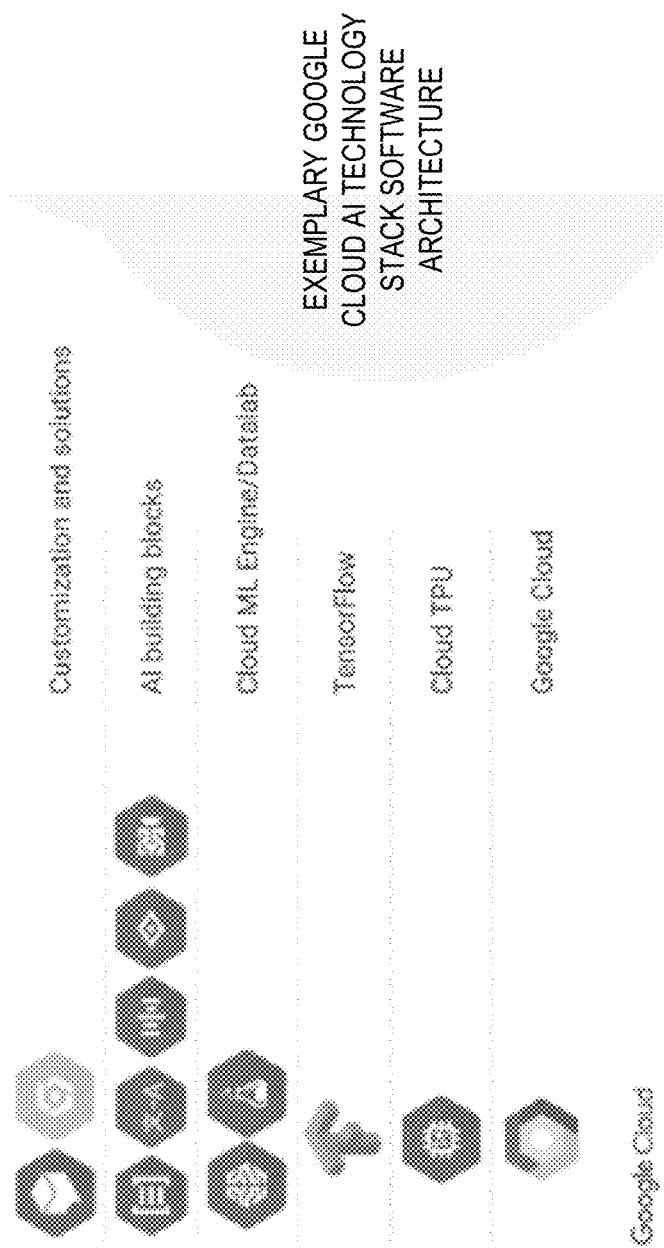
FIG. 15 depicts an exemplary embodiment of an exemplary GOOGLE cloud AI technology stack as can be used to implement any of various exemplary embodiments.

FIG. 15 depicts an exemplary embodiment of a block diagram 1500 illustrating an exemplary Google cloud artificial intelligence (AI) technology stack, exemplary computer-implemented energy optimization energy storage device sizing and management system and/or software architecture as can be used in one embodiment, to perform exemplary predictive analytics processing, according to one exemplary embodiment.

Figure 16:
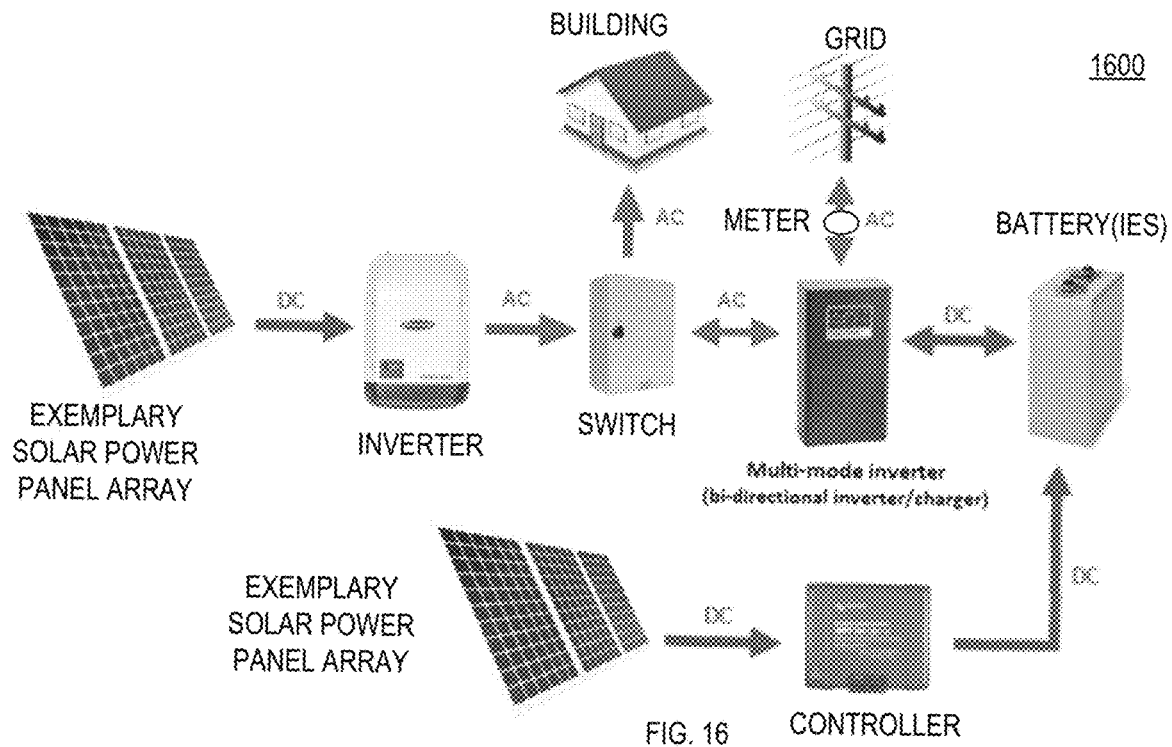
FIG. 16 depicts an exemplary embodiment of a block diagram illustrating an entity with an exemplary alternating current (AC) switch coupled to a solar panel via an exemplary DC to AC inverter, AC building load devices, and a batter via an exemplary multi-mode inverter, which in an exemplary embodiment can include a bi-directional inverter/charger for charging a DC battery, the multimode inverter can be coupled to a meter to access the utility grid via AC, and the battery as shown can be further coupled to a controller device coupling the battery by DC current to an exemplary solar power panel array, the exemplary multimode inverter or switch can include intelligence and/or program logic of a controller, according to one exemplary embodiment.

FIG. 16 depicts an exemplary embodiment of a block diagram 1600 illustrating an entity with an exemplary alternating current (AC) switch coupled to a solar panel via an exemplary DC to AC inverter, AC building load devices, and a batter via an exemplary multi-mode inverter, which in an exemplary embodiment can include a bi-directional inverter/charger for charging a DC battery, the multimode inverter can be coupled to a meter to access the utility grid via AC, and the battery as shown can be further coupled to a controller device coupling the battery by DC current to an exemplary solar power panel array, the exemplary multi-mode inverter or switch can include intelligence and/or program logic of a controller, according to one exemplary embodiment.

Figure 17:
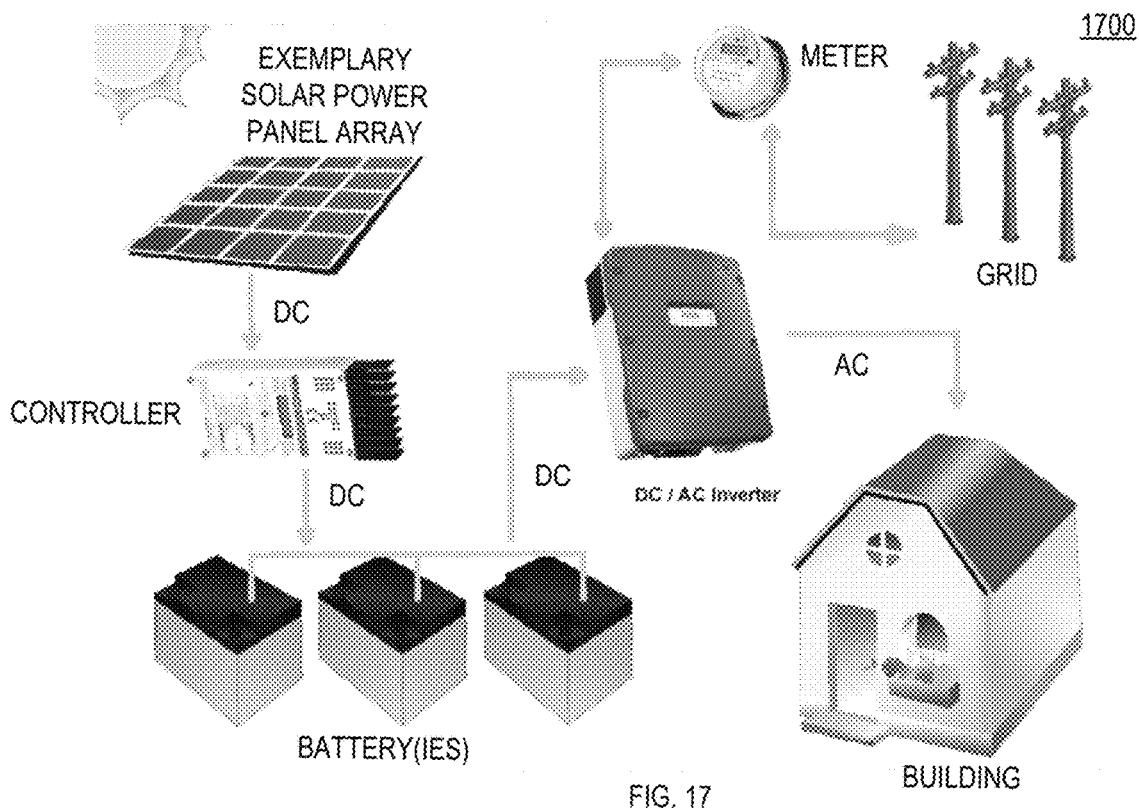
FIG. 17 depicts an exemplary embodiment of a block diagram illustrating an entity with an exemplary direct current (DC) alternating current (AC) inverter coupled by DC to a plurality of batteries and coupled to by DC to a controller for a DC exemplary solar power panel array such as, e.g., but not limited to a photovoltaic (PV), the DC/AC inverter can be coupled to building AC loads by AC, and can be coupled to a meter to access AC utility grid energy resources, the inverter can include intelligence and/or program logic of a controller, according to one exemplary embodiment.

FIG. 17 depicts an exemplary embodiment of a block diagram 1700 illustrating an entity with an exemplary direct current (DC) alternating current (AC) inverter coupled by DC to a plurality of batteries and coupled to by DC to a controller for a DC exemplary solar power panel array such as, e.g., but not limited to a photovoltaic (PV), the DC/AC inverter can be coupled to building AC loads by AC, and can be coupled to a meter to access AC utility grid energy resources, the inverter can include intelligence and/or program logic of a controller, according to one exemplary embodiment.

Figure 18:
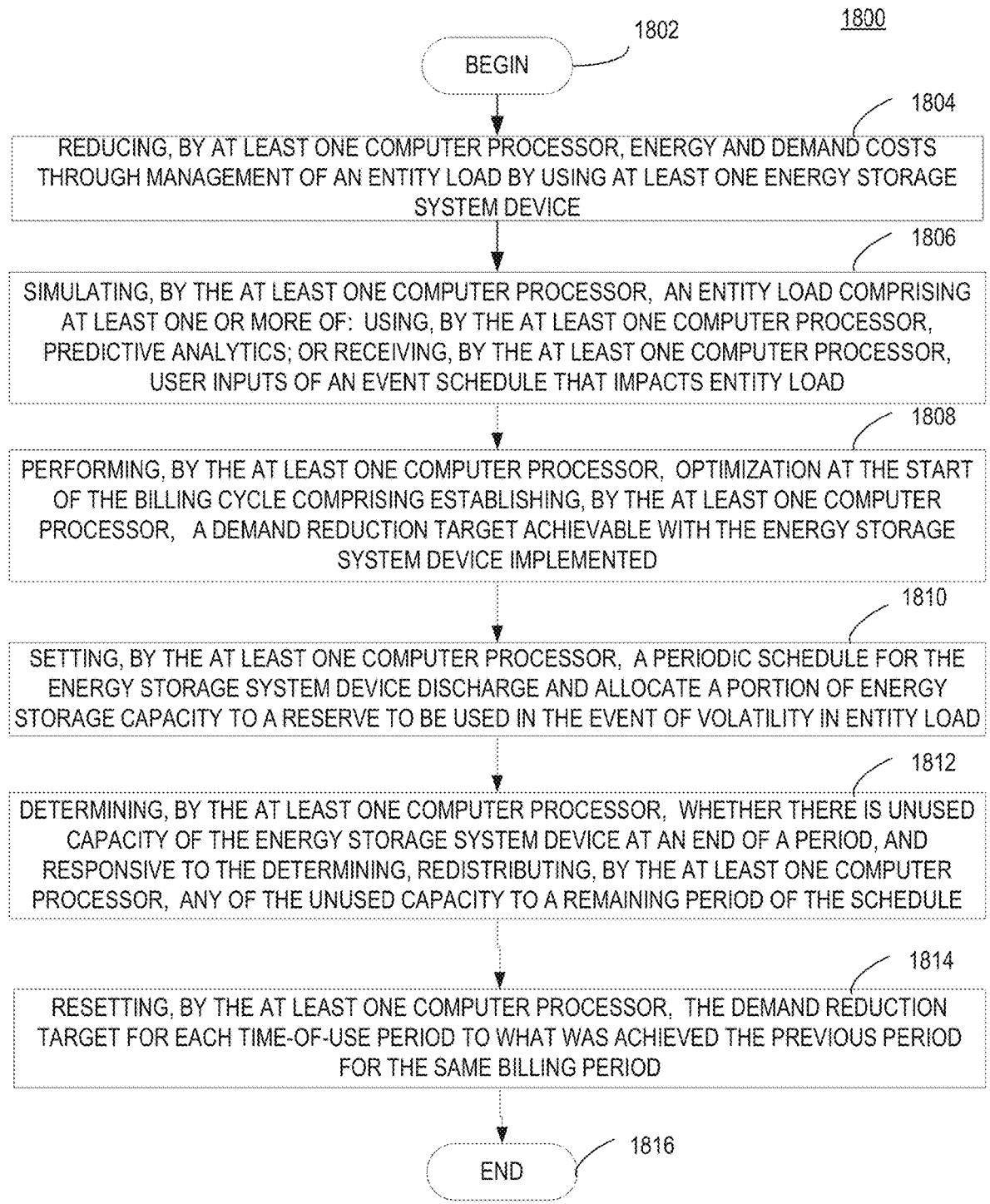
FIG. 18 depicts an exemplary flow diagram 1800 illustrating an exemplary process flow for an exemplary method, according to one exemplary embodiment.

FIG. 18 depicts an exemplary flow diagram 1800 illustrating an exemplary process flow for an exemplary method, according to one exemplary embodiment. According to an exemplary embodiment, the flow diagram 1800 can begin with 1802 and can continue immediately with an exemplary method, which can include, e.g., but not limited to, in 1804, reducing, by at least one computer processor, energy and demand costs through management of an entity load by using at least one energy storage system device; can include, e.g., but not limited to, in 1806, simulating, by the at least one computer processor, an entity load comprising at least one or more of: using, by the at least one computer processor, predictive analytics; or receiving, by the at least one computer processor, user inputs of an event schedule that impacts entity load; can include, e.g., but not limited to, in 1808 performing, by the at least one computer processor, optimization at the start of the billing cycle comprising establishing, by the at least one computer processor, a demand reduction target achievable with the energy storage system device implemented; can include, e.g., but not limited to, in 1810 setting, by the at least one computer processor, a periodic schedule for the energy storage system device discharge and allocate a portion of energy storage capacity to a reserve to be used in the event of volatility in entity load; can include, e.g., but not limited to, in 1812 determining, by the at least one computer processor, whether there is unused capacity of the energy storage system device at an end of a period, and responsive to the determining, redistributing, by the at least one computer processor, any of the unused capacity to a remaining period of the schedule; and can include, e.g., but not limited to, in 1814 resetting, by the at least one computer processor, the demand reduction target for each time-of-use period to what was achieved the previous period for the same billing period, and can continue with 1816, where method of process 1800 can immediately end, according to an exemplary embodiment. Various exemplary embodiments can include further features including both optional features and others as claimed in the various independent and dependent claims set forth below.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A whole building or campus entity, energy management and energy control optimization system including a computer processor service provider system wherein the computer processor service provider system comprises a cloud-based computer processor service provider system comprising:
    at least one application server comprising the whole building or campus entity, energy management and energy control optimization system executing in the cloud-based computer processor service provider system; and
    an onsite energy controller coupled to the cloud-based computer processor service provider system by an electronic communications network;
        wherein said onsite energy controller comprises:
            at least one electronic computer processor; and
            at least one electronic computer memory coupled to said at least one electronic computer processor;
        wherein said at least one electronic computer processor of said onsite energy controller is configured to:
            reduce energy and demand costs through whole building or campus entity energy management of a building or campus entity load including by being configured to at least one or more of:
                optimize energy usage;
                optimize energy generation;
                maximize demand reduction and utility savings through optimal control of:
                    the energy usage, and
                    the energy generation, or
                reduce energy costs; and
                use of at least one energy storage system device;
            simulate said building or campus entity load by use of at least one or more of:
                predictive analytics; or
                receive user inputs of an event schedule that impacts said building or campus entity load;
            perform optimization at the start of the billing cycle to establish a demand reduction target achievable with the at least one energy storage system device implemented;
            set a periodic schedule for discharge of the at least one energy storage system device and allocate a portion of energy storage capacity to a reserve to be used in the event of volatility in said building or campus entity load;
            determine whether there is unused capacity of the at least one energy storage system device at an end of a period, and responsive to the determination, redistribute any of the unused capacity to a remaining period of the periodic schedule; and
reset the demand reduction target for each time-of-use period to what was achieved in the previous period for the same billing period.

2. The system according to claim 1, wherein the at least one energy storage system device comprises at least one or more of:
   at least one battery;
   at least one lithium ion battery;
   at least one lead acid battery;
   at least one heat exchanger system; or
   at least one compressed air energy storage device.

3. The system according to claim 1, wherein said building or campus entity comprises at least one or more of:
   a business;
   a residential home;
   a commercial business;
   a governmental building;
   a private building;
   a public building;
   a group of associated buildings;
   an investor owned utility or a municipal utility
   a university; or
   a school.

4. The system according to claim 1, wherein said at least one processor of said onsite energy controller is configured to simulate said building or campus entity load comprising wherein said at least one electronic computer processor is configured to at least one or more of:
   receive dynamic electric vehicle (EV) load based on at least one or more of:
      at least one type of an EV; or
      a frequency of charging of an EV at a specific location; or
   simulate said building or campus entity load from impact of EV charging.

5. The system according to claim 4, wherein said received EV load, or said simulation of said building or campus entity load from impact of said EV charging comprises wherein said at least one electronic computer processor is configured to:
   receive EV load or simulate impact of said EV charging comprising:
      at least one TESLA electric vehicle;
      at least one automotive electric vehicle;
      at least one sport utility vehicle electric vehicle;
      at least one electric truck vehicle;
      at least one motor cycle electric vehicle;
      at least one tractor trailer electric vehicle;
      any kind of municipal fleet vehicle;
      at least one postal vehicle;
      at least one bus; or
      at least one garbage truck.

6. The system according to claim 4, wherein said received EV load or said simulation of said building or campus entity load from impact of said EV charging comprises wherein said at least one electronic computer processor is configured to:
   simulate impact of said EV charging comprising:
      at least one battery type;
      at least one charger type;
      at least one DC charger;
      at least one fast DC charger;
      at least one AC charger;
      at least one predetermined frequency of charging;
      at least one predetermined number of simultaneous electric vehicles charging;
      at least one historical data of electric vehicle charging;
      at least one machine learning prediction of an expected number of EV charging in a given time period;
      at least one seasonality effect on EV charging; or
      at least one expected number of EV vehicles on the road as a proportion of market share to calculate said building or campus entity load.

7. The system according to claim 1, wherein said management comprises real-time management.

8. The system according to claim 1, wherein said at least one electronic computer processor is configured to reduce said energy and said demand costs through management of said building or campus entity load further comprising:
   at least one load shedding process.

9. The system according to claim 1, wherein said cloud-based computer processor service provider system comprises at least one or more of:
   an AMAZON WEB SERVICES (AWS) cloud-based system;
   a GOOGLE cloud-based system;
   a MICROSOFT cloud-based system;
   an IBM cloud-based system; or
   another cloud-based system.

10. The system according to claim 1, wherein said predictive analytics comprises at least one or more of:
    machine learning (ML)-based analysis system, or an artificial intelligence (AI)-based analysis system, based on at least one or more of:
       weather data comprising at least one or more of:
          temperature data comprising at least one or more of:
             heating degree days,
             cooling degree days, or
             humidity,
          cloud cover data, or
          other weather element data;
       historical data comprising at least one or more of:
          week of the year data,
          previous energy efficiency improvements, or
          ongoing energy efficiency improvements;
       current occupancy rates; or
       impact of electric vehicle (EV) charging comprising at least one or more of:
          at least one battery type;
          at least one charger type;
          at least one DC charger;
          at least one fast DC charger;
          at least one AC charger;
          at least one predetermined frequency of charging;
          at least one predetermined number of simultaneous electric vehicles charging;
          at least one historical data of electric vehicle charging;
          at least one machine learning prediction of an expected number of EV charging in a given time period;
          at least one seasonality effect on EV charging; or
          at least one expected number of EV vehicles on the road as a proportion of market share to calculate said building or campus entity load.

11. The system according to claim 1, wherein said building or campus entity load comprises at least one or more of:
    a daily portion of said building or campus entity load;
    an entity load for a period of time of said building or campus entity load;

an entity load for a fraction of a day of said building or campus entity load;
an entity load for an increment of time of said building or campus entity load;
an entity load for an up to a 15 minute increment of time of said building or campus entity load;
an entity load for a 15 minute increment of time of said building or campus entity load;
an entity load for a 1 day period of said building or campus entity load;
an entity load for a 2 day period of said building or campus entity load;
an entity load for a 3 day period of said building or campus entity load;
an entity load for a 4 day period of said building or campus entity load;
an entity load for a 3-4 day period of said building or campus entity load;
an entity load for a 5 day period of said building or campus entity load;
an entity load for a 6 day period of said building or campus entity load;
an entity load for a 7 day period of said building or campus entity load;
an entity load for a one week period of said building or campus entity load;
an entity load for a multiple week period of said building or campus entity load;
an entity load for a month long period of said building or campus entity load;
an entity load for a multiple month period of said building or campus entity load;
an entity load for a season long period of said building or campus entity load;
an entity load for a multiple season long period of said building or campus entity load;
an entity load for a year long period of said building or campus entity load; or
an entity load for a multiple year long period of said building or campus entity load.

12. The system according to claim 1, wherein said event schedule comprises at least one or more of:
a daily event schedule;
a daily periodic schedule;
a daily minute-by-minute schedule;
an event schedule for a period of time;
an event schedule for a fraction of a day;
an event schedule for an increment of time;
an event schedule for an up to a 15 minute increment of time;
an event schedule for a 15 minute increment of time;
an event schedule for a 1 day period;
an event schedule for a 2 day period;
an event schedule for a 3 day period;
an event schedule for a 4 day period;
an event schedule for a 3-4 day period;
an event schedule for a 5 day period;
an event schedule for a 6 day period;
an event schedule for a 7 day period;
an event schedule for a one week period;
an event schedule for a multiple week period;
an event schedule for a month long period;
an event schedule for a multiple month period;
an event schedule for a season long period;
an event schedule for a multiple season long period;
an event schedule for a year long period; or
an event schedule for a multiple year long period.

13. The system according to claim 1, wherein said demand reduction target comprises at least one or more of:
a daily demand reduction target;
a demand reduction target for a period of time; or
a demand reduction target for a fraction of a day;
a demand reduction target for an increment of time;
a demand reduction target for an up to a 15 minute increment of time;
a demand reduction target for a 15 minute increment of time;
a demand reduction target for a 1 day period;
a demand reduction target for a 2 day period;
a demand reduction target for a 3 day period;
a demand reduction target for a 4 day period;
a demand reduction target for a 3-4 day period;
a demand reduction target for a 5 day period;
a demand reduction target for a 6 day period;
a demand reduction target for a 7 day period;
a demand reduction target for a one week period;
a demand reduction target for a multiple week period;
a demand reduction target for a month long period;
a demand reduction target for a multiple month period;
a demand reduction target for a season long period;
a demand reduction target for a multiple season long period;
a demand reduction target for a year long period; or
a demand reduction target for a multiple year long period.

14. The system according to claim 1, wherein the time-of-use period comprises at least one or more of:
peak;
off peak;
super off peak;
charging off peak;
discharging peak; or
another time-of-use period.

15. The system according to claim 1, further comprising wherein said at least one electronic computer processor of said onsite energy controller is configured to:
determine one or more of:
whether actual entity load is greater than a predicted load of said building or campus entity load; or
whether on-site renewable energy production does not sufficiently meet said predicted load and the at least one energy storage system device usage is higher than what was set aside including reserve, and
responsive to said determination, start automatic load shedding based on priorities set by owner of the entity.

16. The system according to claim 15, wherein said automatic load shedding comprises at least one of:
shed lighting load in certain parts of the entity;
shed other electricity demand load of the entity;
shed non-essential electricity demand load of the entity;
maintaining essential electricity demand load for essential services of the entity;
shed air conditioning load;
shed heating load;
shed heating ventilation air conditioning (HVAC) load;
cut off power to an EV charging station;
cut off air conditioning load;
cut off heating;
cut off fan; or
perform another predetermined load shedding function.

17. The system according to claim 1, further comprising wherein said at least one electronic computer processor of said onsite energy controller is configured to:

participate in at least one utility service comprising at least one or more of:
- demand response;
- frequency management; or
- another ancillary service.

18. The system according to claim 1, further comprising using at least one alternative energy generation source comprising at least one or more of:
- an alternative energy generation source;
- a solar energy generation source;
- a turbine-based energy generation source;
- a wind turbine energy generation source;
- a renewable energy generation source;
- a direct current (DC) based energy generation source;
- an alternating current (AC) based energy generation source;
- a hybrid energy generation source;
- a diesel generator energy generation source;
- a hydrogen fuel cell energy generation source;
- a nuclear energy generation source;
- a heat based energy generation source;
- a combined heat and power (CHP) energy generation source;
- a generator energy generation source;
- a solar panel energy generation source;
- an electronic vehicle solar energy generation source;
- a water based turbine energy generation source;
- a turbocharged energy generation source; or
- a supercharged energy generation source.

19. The system according to claim 1, wherein the cloud-based computer processor service provider system is hosted on at least one or more of a MICROSOFT AZURE cloud, a GOOGLE cloud, an AMAZON WEB SERVICES cloud, an IBM cloud, or another vendor cloud-based system, and at least one or more of:
- a cloud-based artificial intelligence (AI)-based system, or
- a cloud-based machine learning (ML)-based system, and wherein the cloud-based computer processor service provider system is configured to receive at least one or more of:
- dynamic electric vehicle load data; or
- frequency of electric vehicle charging data.

20. A computer-implemented whole building or campus entity, energy management and energy control optimization method including providing a computer processor service provider system wherein the computer processor service provider system comprises a cloud-based computer processor service provider system, the method comprising:

reducing, by at least one electronic computer processor of the cloud-based computer processor service provider system, energy and demand costs through whole building or campus entity energy management of a building or campus entity load by at least one or more of:
- optimizing energy usage;
- optimizing energy generation;
- maximizing demand reduction and utility savings through optimal control of:
  - the energy usage, and
  - the energy generation, or
- reducing energy costs; and using at least one energy storage system device;

simulating, by the at least one electronic computer processor, said building or campus entity load comprising at least one or more of:
- using, by the at least one electronic computer processor, predictive analytics; or
- receiving, by the at least one electronic computer processor, user inputs of an event schedule that impacts said building or campus entity load;

performing, by the at least one electronic computer processor, optimization at the start of the billing cycle comprising establishing, by the at least one computer processor, a demand reduction target achievable with the at least one energy storage system device implemented;

setting, by the at least one electronic computer processor, a periodic schedule for discharge of the at least one energy storage system device and allocating a portion of energy storage capacity to a reserve to be used in the event of volatility in said building or campus entity load;

determining, by the at least one electronic computer processor, whether there is unused capacity of the at least one energy storage system device at an end of a period, and responsive to the determining, redistributing, by the at least one computer processor, any of the unused capacity to a remaining period of the periodic schedule; and resetting, by the at least one electronic computer processor, the demand reduction target for each time-of-use period to what was achieved in the previous period for the same billing period.

21. A whole building or campus entity, energy management and energy control optimization nontransitory computer accessible media, embodying program instructions, which when executed on at least one electronic computer processor of a cloud-based computer processor service provider system, perform a method according to claim 20.

* * * * *